United States Patent
Stasi et al.

(10) Patent No.: US 10,235,730 B1
(45) Date of Patent: Mar. 19, 2019

(54) CASINO TABLE GAMES WITH INTERACTIVE CONTENT

(71) Applicant: VisuaLimits, LLC, Henderson, NV (US)

(72) Inventors: Perry Stasi, Las Vegas, NV (US); Ryan McClellan, Henderson, NV (US)

(73) Assignee: VISUALMITS, LLC, Henderson, NV (US)

( * ) Notice: Subject to any disclaimer, the term of this patent is extended or adjusted under 35 U.S.C. 154(b) by 112 days.

(21) Appl. No.: 14/325,375

(22) Filed: Jul. 8, 2014

Related U.S. Application Data

(63) Continuation-in-part of application No. 13/934,693, filed on Jul. 3, 2013.

(60) Provisional application No. 61/884,057, filed on Sep. 29, 2013, provisional application No. 61/843,903, filed on Jul. 8, 2013, provisional application No. 61/825,507, filed on May 20, 2013.

(51) Int. Cl.
```
G06Q 50/34      (2012.01)
G06K 9/60       (2006.01)
H04N 1/00       (2006.01)
H04N 7/18       (2006.01)
G06K 9/00       (2006.01)
G06Q 10/10      (2012.01)
G06T 7/00       (2017.01)
H04N 101/00     (2006.01)
```

(52) U.S. Cl.
CPC ......... *G06Q 50/34* (2013.01); *G06K 9/00369* (2013.01); *G06K 9/60* (2013.01); *G06Q 10/10* (2013.01); *G06T 7/0012* (2013.01); *H04N 1/00204* (2013.01); *H04N 7/183* (2013.01); *G06T 2207/10016* (2013.01); *G06T 2207/30196* (2013.01); *H04N 2101/00* (2013.01)

(58) Field of Classification Search
CPC combination set(s) only.
See application file for complete search history.

(56) References Cited

U.S. PATENT DOCUMENTS

| | | | |
|---|---|---|---|
| 8,397,305 B2* | 3/2013 | Saunders | G06F 7/58 726/27 |
| 9,251,422 B2* | 2/2016 | Givon | G06K 9/00771 |
| 2003/0069071 A1* | 4/2003 | Britt | G07F 17/32 463/42 |
| 2006/0046838 A1* | 3/2006 | Paulsen | G07F 17/32 463/25 |
| 2006/0177109 A1* | 8/2006 | Storch | A63F 1/00 382/118 |
| 2007/0155491 A1* | 7/2007 | Okada | G07F 17/32 463/29 |
| 2007/0173318 A1* | 7/2007 | Abbott | G07F 17/32 463/25 |

(Continued)

*Primary Examiner* — Tsung-Yin Tsai
(74) *Attorney, Agent, or Firm* — Ulmer & Berne LLP

(57) ABSTRACT

A method, apparatus and computer readable storage to implement an automated system for video surveillance in a casino or other controlled environment. Players in the casino can be automatically scanned and analyzed for whether they are under the legal gambling age or not. When an underage gambler is detected, a casino security employee (or other casino personnel) is notified so they can take the appropriate action. Similarly, players who are excluded from the casino can also be automatically detected and would be ejected when detected.

9 Claims, 26 Drawing Sheets

(56) References Cited

U.S. PATENT DOCUMENTS

| | | | | |
|---|---|---|---|---|
| 2008/0076545 A1* | 3/2008 | Oliveras | G07F 17/32 |
| | | | 463/29 |
| 2009/0171709 A1* | 7/2009 | Chisholm | G06Q 30/06 |
| | | | 705/35 |
| 2009/0176566 A1* | 7/2009 | Kelly | G07F 17/32 |
| | | | 463/29 |
| 2012/0330740 A1* | 12/2012 | Pennington | G07F 17/32 |
| | | | 705/14.27 |
| 2013/0223694 A1* | 8/2013 | Ricanek, Jr. | G06K 9/00221 |
| | | | 382/118 |
| 2014/0347479 A1* | 11/2014 | Givon | G06K 9/00342 |
| | | | 348/143 |
| 2016/0109942 A1* | 4/2016 | Lyons | G06K 9/00 |
| | | | 345/156 |

* cited by examiner

```
            ADVERTISEMENT #3 – Joe's Steak House
            Time period: 01/01/2013 to 04/01/2013

Number of displayed: 154
Sex: Male: 75% Female 25%
Age: <30 20%; 30-40: 25%; 40-50 10%; 50+:45%
Income: low: 5%; hi: 15%; veryhi: 60%; unknown: 20%
Marital Status: Single: 40%; Married: 45%; unknown 15%
Dining pattern:infreq:22%; Mod: 25%; frequ:49%;unknown:4%
```

1900 — Please touch the coupon below:

1) Joe's Steak house - 10% off
2) Jennies Nail's – free manicure
3) Rusty's Nightclub – free admission
4) Joe's Steak House – free dessert
5) Mo's Haunted House – 50% of first drink 1901 — Please hold the player's device nearby...

USUS 10,235,730 B1

CASINO TABLE GAMES WITH INTERACTIVE CONTENT

This Application claims benefit to U.S. provisional application 61/843,903, which is incorporated by reference herein in its entirety. This Application also claims benefit to U.S. provisional application 61/884,057, which is incorporated by reference herein in its entirety. This application is a continuation in part of U.S. application Ser. No. 13/934,693, which is incorporated by reference herein in its entirety which claims benefit to U.S. provisional 61/825,507 which is incorporated by reference herein in its entirety.

BACKGROUND OF THE INVENTION

Field of the Invention

The present general inventive concept is directed to a method, apparatus, and computer readable storage medium directed to a casino table game system with interactive content.

Description of the Related Art

Digital table signs are known in the art which can display different advertisements to a casino table. The advertisements shown are pre-chosen and are cycled through on the sign over and over again.

What is needed is a more flexible and dynamic system which can choose optimal advertisements targeted to players that are actually at the table.

SUMMARY OF THE INVENTION

It is an aspect of the present invention to provide an improved digital sign system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 15 is a drawing of an example audience statistics tabulated for a particular advertisement, according to an embodiment;

FIG. 19 is a drawing of an exemplary rear screen of a sign used to select a coupon, according to an embodiment.

DESCRIPTION OF THE PREFERRED EMBODIMENTS

Figure 1:
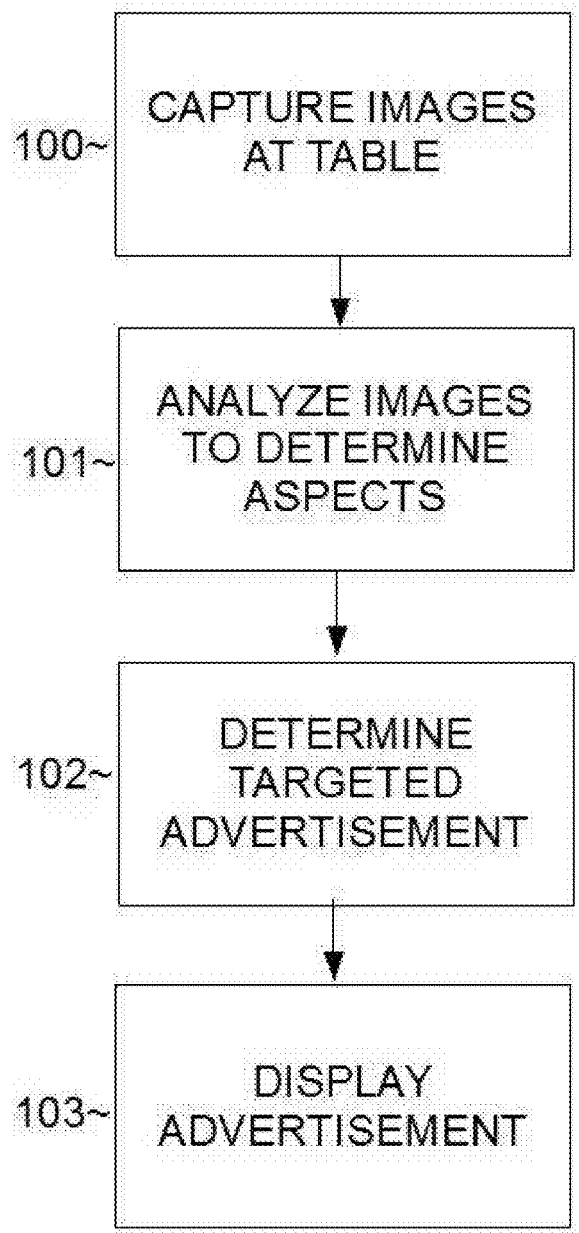
FIG. 1 is a flowchart illustrating an exemplary method of implementing a method to display targeted advertisements, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement an advertising system for displaying targeted video advertisements on an electronic digital sign at a blackjack table in a casino. The digital sign can be of the type described in U.S. patent publication 20100056271 which is incorporated by reference herein in its entirety. Players at the table (e.g., a blackjack table, etc.) can be recognized using any form of optical recognition (where images from the camera are transmitted to a computer which then analyzes the images and identified aspects about the images), the identifies aspects then being used by the computer to determine particular advertisements that would be targeted to the particular casino table.

FIG. 1 is a flowchart illustrating an exemplary method of implementing a method to display targeted advertisements, according to an embodiment.

The method can begin with operation 100, wherein images are captured at the table. This can be done by capturing video images from a digital video camera. The video camera can be located in a casino sign (the same one that displays the advertisements), in the "sky" (ceiling), in the chip rack, or any other location on or outside of the casino table. The camera would be in contact with a computer (either by wireless or physical connection) so the images from the camera can be transmitted to the computer.

From operation 100, the method proceeds to operation 101, wherein a computer (such as the advertisement database, or player database or other server in communication with some or all cameras) that receives the images from the camera analyzes the images. The images can be analyzed to determine any combination of any number of the following: a) the identities of the people playing at the table (this can be determined, for example, by supplying faces detected in the images to face recognition software); b) the age of player(s) at the table; c) the sex of the player(s) at the table; d) whether player(s) at the table are happy or upset (can be detected by their facial expressions); e) how much player(s) are winning are losing; f) how much the player(s) are betting; g) whether player(s) are smoking; h) whether player(s) are wearing glasses; i) whether player(s) are dressed in expensive of inexpensive clothing; and any other information that can be automatically and electronically ascertained from the video or still images.

In addition, player information from the casino player database can be used to retrieve additional information about the player(s). This can be done by using face recognition to identify a player the table, and from that player's identity query the player database to retrieve player information about the player in the database. Face recognition is known in the art and is described in U.S. patent publications 2013/0010095 and 2013/0044923, both of which are incorporated by reference herein in their entireties. If a player is using his/her comp card and the player's seat at the table is known to the system, then this can be used to identify the player and any information that is known about the player in the player database can be used. Player information that can be retrieved from the player database and used to determine a targeted advertisement can be any combination of any number of the following: a) zip code player lives in; b) amount of credit the player has with the casino; c) overall playing history of the player; and d) any other information known to the player database. Typically, it is preferable (when possible) to use information about a player in the player database rather than rely only on visual information about the player (because the player database would typically have more information about the player).

From operation 101, the method proceeds to operation 102 which determines one or more targeted advertisements to display based on the aspects from operation 101. This can be done by associating advertisements with different categories and then matching one or more of the determined aspects to the categories to select the advertisement. Player information can also be used to determine a targeted advertisement (on its own or in combination with determined aspects). Thus, both information gleaned optically (determined aspects) and information already known about the player stored in the player database (player database) can both be used to select a targeted advertisement.

In an embodiment, the aspects of the players at the table can be averaged. For example, if the income of each player is known, then an average can be taken of all of the players at the table to determine the "income" aspect of the overall table. The sexes can also be averaged, for example males can be given a value of 1 and females can be given a value of 2, and then the sex score (e.g., 1 or 2) of each player can be added up and divided by the number of players to determine the average sex score. Thus, if the average sex score (sex aspect for the table) is over 1.5 then the majority of players at the table are female. Thus, in this manner, an average can be taken of all aspects of players at the table (e.g., age, dining patterns, betting amounts, amount won, etc.) This average can then be compared to the categories of each potential advertisement to select a next advertisement to display. Typically, all of the players at the table are used to make these determinations (using all information that the system knows about all players at the table). A casino table can seat any number of players (e.g., 7, 8, or more) and information/aspects about all players at the table are used when determining a targeted advertisement. Of course if the system does not know particular information about a particular player at the table, then that aspect of that player would not be used. For example, if the income of a particular player is not known to the system (while incomes of other players at the table are known to the system), then the income of the particular player is simply not used in the determinations of a targeted advertisement while the incomes of the other players are used.

In an alternative embodiment, instead of considering all of the players at the table, only aspects of relevant players at the table are considered when advertisements are selected. For example, if a player at the table is known to be very rich (or happens to have a large amount of current winnings or available chips), then advertisements can only be selected based on aspects from the relevant player(s). The relevant players can be determined based on whether they meet a one or more conditions (e.g., if their income or net worth is over a predetermined threshold, etc.) In this embodiment, players at the table who do not meet the one or more conditions are not relevant players and they are not considered (i.e., their aspects are not considered) when advertisements are determined.

It is also noted that if a particular advertisement has already been displayed, then it typically would not be displayed again until a plurality of other advertisements (e.g., 5 or other predetermined number) have been played. This gives other advertisements a chance to be displayed, even if the particular advertisement has the best match (between its categories and the table aspects) out of all of the potential advertisements.

From operation 102, the method proceeds to operation 103, which displays the advertisement selected from operation 102.

Operations 100 to 103 can continuously be repeated and thus advertisements can be continuously displayed at a casino table based on aspects determined from optical recognition of activity at the table.

An example of how this method can operate is as follows. A casino table has five men and one woman. A camera captures video images (or still) of the table and analyzes the images to determine that there are five men and one woman. This determination can be made by visual characteristics, e.g., long hair, facial features, etc. Since there are more men than women at the table, advertisements will be displayed with a category of "male" (e.g., gentleman's club, hard liquor, men's clothing store, etc.) Over time three of the men leave the table and two women join the table, thus now having two men and three women at the table. Now since there are more women than men, advertisements associated with women are shown (e.g., for a beauty salon, makeup products, etc.)

Note that information about the players at the table (the aspects or player aspects or table aspects) can also be determined via the casino player database 305 (which is maintained by the casino or casino group and stores all history and information about its players). When players play at the table they can identify themselves with a comp card (or "players card") and the pit staff then swipes the card into a card reader and thus the casino knows the player is playing (the pit staff typically also tracks and enters the player's bet amounts as well. The player database has lots of information about the players (e.g., sex, age, address, income, playing history, restaurant eating history, frequency of visits, etc.) When a player can be identified in the player database (typically by their comp card or using face recognition of their appearance to locate their account in the player database), information from the player database is typically preferable than relying solely on visual information about the player (since the player database has more information about players than can be discerned visually such as their zip code, family size, restaurant history, etc.) In order to evaluate the composition of a table, the system can rely only on visual information, rely only information in the player database (although players can be identified based on their appearance), or combine both visual information (e.g., sex of unidentified players) and player database information (e.g., sex of identified players and their zip code).

Figure 2:
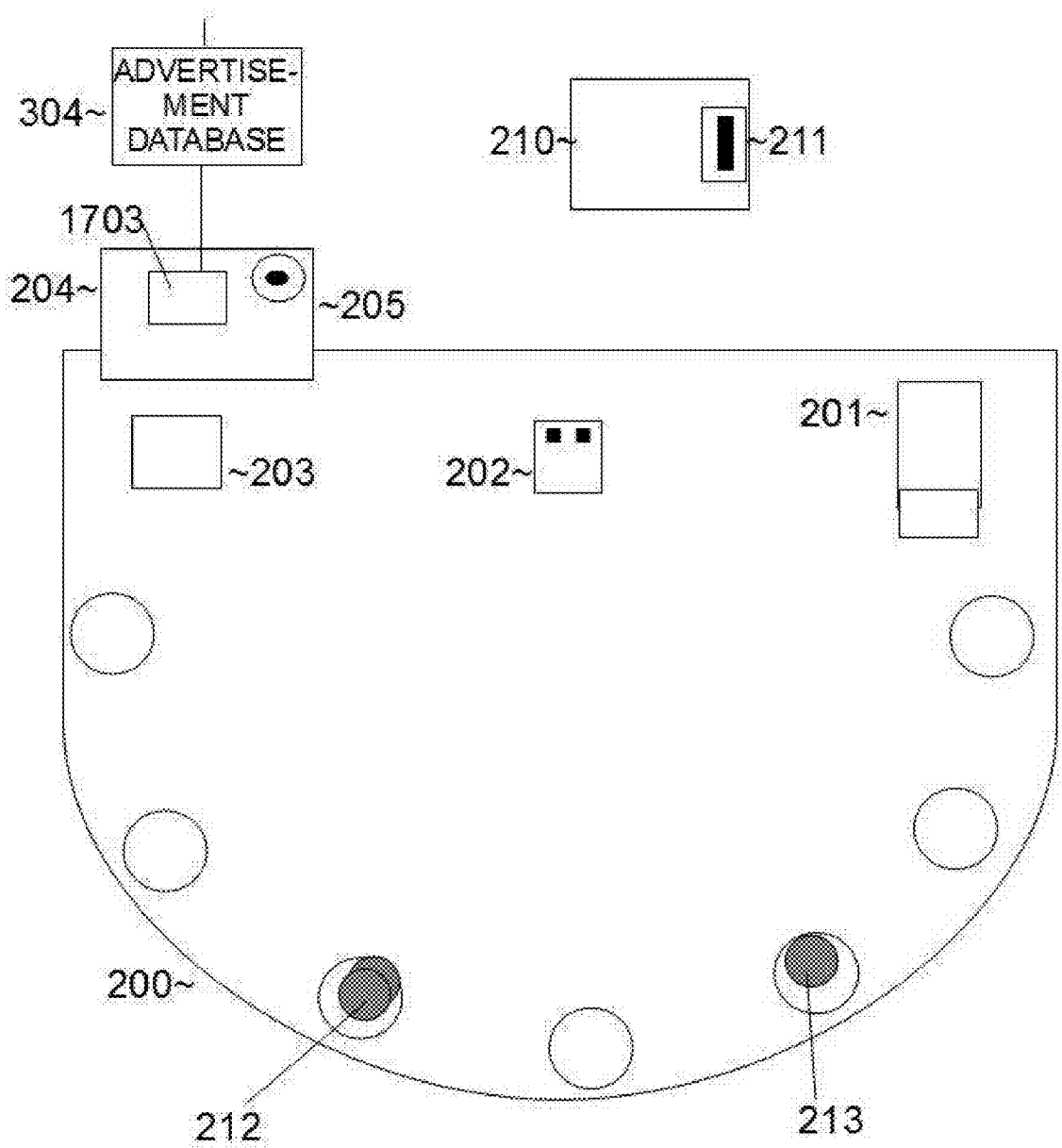
FIG. 2 is a drawing of a casino gaming table, according to an embodiment.

FIG. 2 is a drawing of a casino gaming table, according to an embodiment.

A standard casino gaming table 200 is shown, which can be constructed of wood with a felt layer on the top with the betting circles (and other indicia visible to the players/dealers) imprinted on top of the felt. A shoe 201 is used to house and deal out of one or more decks of cards. An optional electronic hole card reader 202 may be present on blackjack games, the hole card reader 202 electronically senses whether the dealer's hole card is an ace or a ten-valued card (so the dealer knows whether the dealer has blackjack without having to physically peek at the hole card) and lights up a light to indicate of the hole card is a 10-valued card or an ace. Hole card readers are described in U.S. Pat. No. 5,681,039, which is incorporated by reference herein in its entirety. A discard tray (or discard rack) 203 is used to receive cards that have already been dealt. A digital table sign 204 is a digital sign used to display any information and advertisements as described herein. A camera 205 is used to capture live images from the table and the players at the table (the camera can be located anywhere on or off the table). The camera 205 can also capture images of chips 212, 213 at the table and can recognize/determine the dollar amount of each stack of chips placed by each player on each game. It can determine the denomination of each chip by the color (chips are stacked in each betting circle by the player and so the edges are visible by the camera). Note that an advertisement database 304 (or other computer on a network of all devices described herein and/or used as party of the system) is connected to the sign 204 (via a wired or wireless connection) and more particularly to the sign's network connection 1703 which is an interface allowing the electronics of this sign (including its processing unit) to communicate with other computers across the network thereby allowing signs to function as described herein (e.g., display any outputs as described herein and all other functions). Signals (images) from the camera 205 can also be transmitted to the advertisement database 304 (or any other computer or server or database) via the network connection 1703 as well as other inputs from the sign (e.g., button presses, etc.)

When players play casino table games the casino can typically track the player (using an electronic player database) so that the casino knows how much gaming action a player is giving the casino and hence how much to reward each player with complimentaries (free or discounted rooms, food, etc.) Such a system is described in U.S. Pat. No. 5,836,817, which is incorporated by reference herein in its entirety for all purposes. Each player can have their own players card (also referred to as comp card, player's club card, or loyalty card) which is a plastic card that has their name imprinted on it and computer readable indicia (e.g., a magnetic stripe) which stores an identification number of the player's card (and hence the identification number of the player who owns the card). The player's card can be swiped through an electronic card reader 211 which can be electronic read and the data therein transmitted to the associated computer. An associated computer 210 connected to the card reader 211 can be connected to the electronic player database. Casino employees can enter data regarding each player's play (for those players that present a players card) into the computer 210 which transmits the play data (e.g., average bet amount, time of play, etc.) to the electronic player database 305 that stores playing history information for players at the casino.

Figure 3:
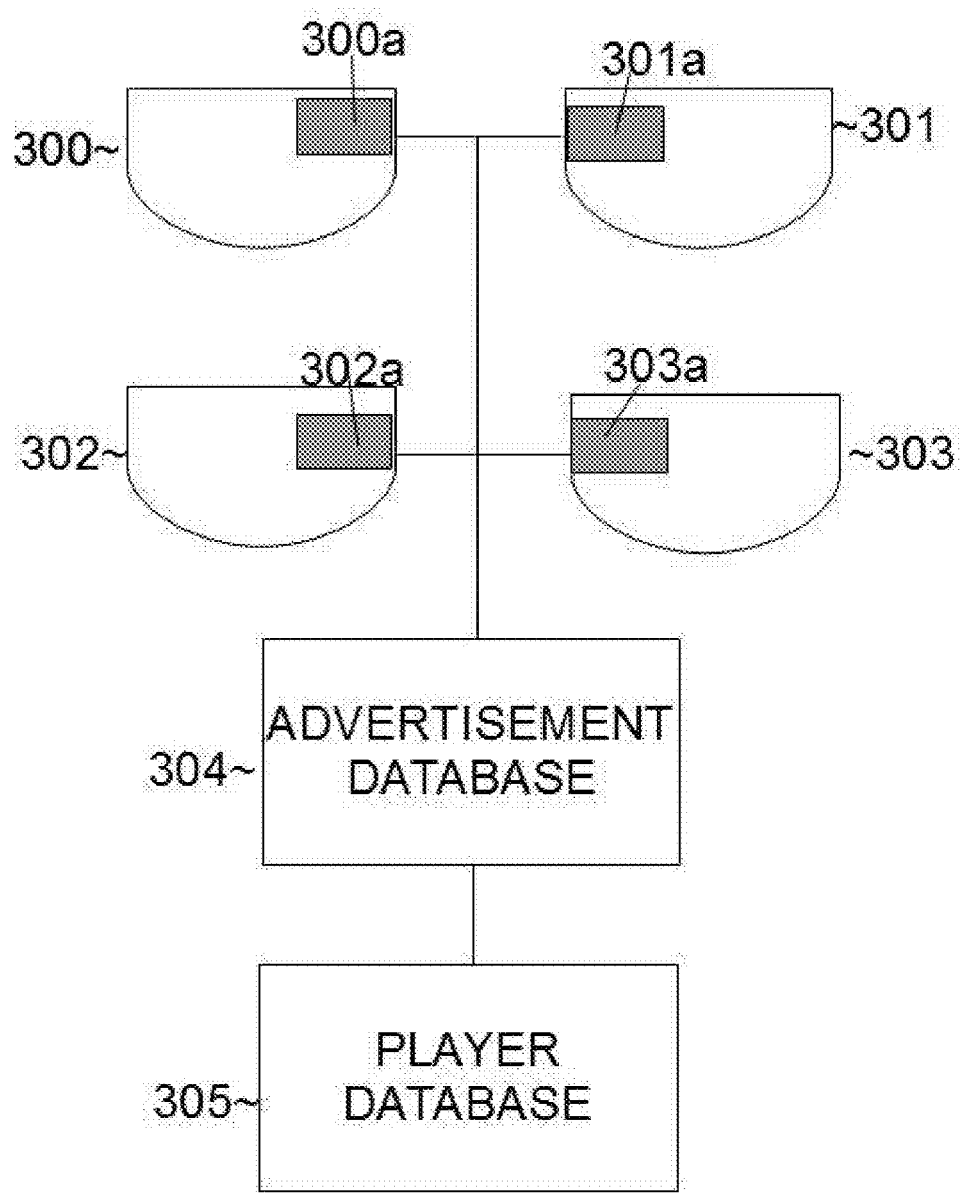
FIG. 3 is a drawing of a casino architecture, according to an embodiment.

FIG. 3 is a drawing of a casino architecture, according to an embodiment.

Casino tables 300, 301, 302, 303 (and any number of others not pictured) have their respective signs 300a, 301a, 302a, 303a (and any number of others not pictured) connected to an advertisement database 304 which determines the advertisements to display as illustrated in FIG. 1 and a player database 305. Note the electrical connections in FIG. 3 are connected to the electronics (such as network connection 1703 but can be another connection or I/O port on the sign as well which connects to the processing unit 1700) of each of the signs 300a, 301a, 302a, 303a (not the tables themselves) so that the signs can send and receive any information described herein to/from the advertisement database 304, player database 305, or any other server/database that carries out any function described herein so that all of the signs can operate as described herein. The player database 305 can be used to store player profiles which comprise the player name, account number, playing history (e.g., times played, average amounts bet, etc., tables or machines played, etc.) This information can also be used by the advertisement database in order to select advertisements which are displayed on the casino tables. Targeted advertisements are selected on a table by table basis, this different advertisements would be displayed on different tables based on the images analyzed at each table.

Typically, players at a gaming table are identified to the casino by presenting a player's card issued to the player which can be swiped into an electronic card reader by the casino staff. The player's identify is then known, and the player's further play is tracked and stored in the player's account. In an embodiment, players can be identified by their appearance without the need for the players to present a player's card. However, the casino would have to initially know the player's appearance in order for this to be possible.

Figure 4:
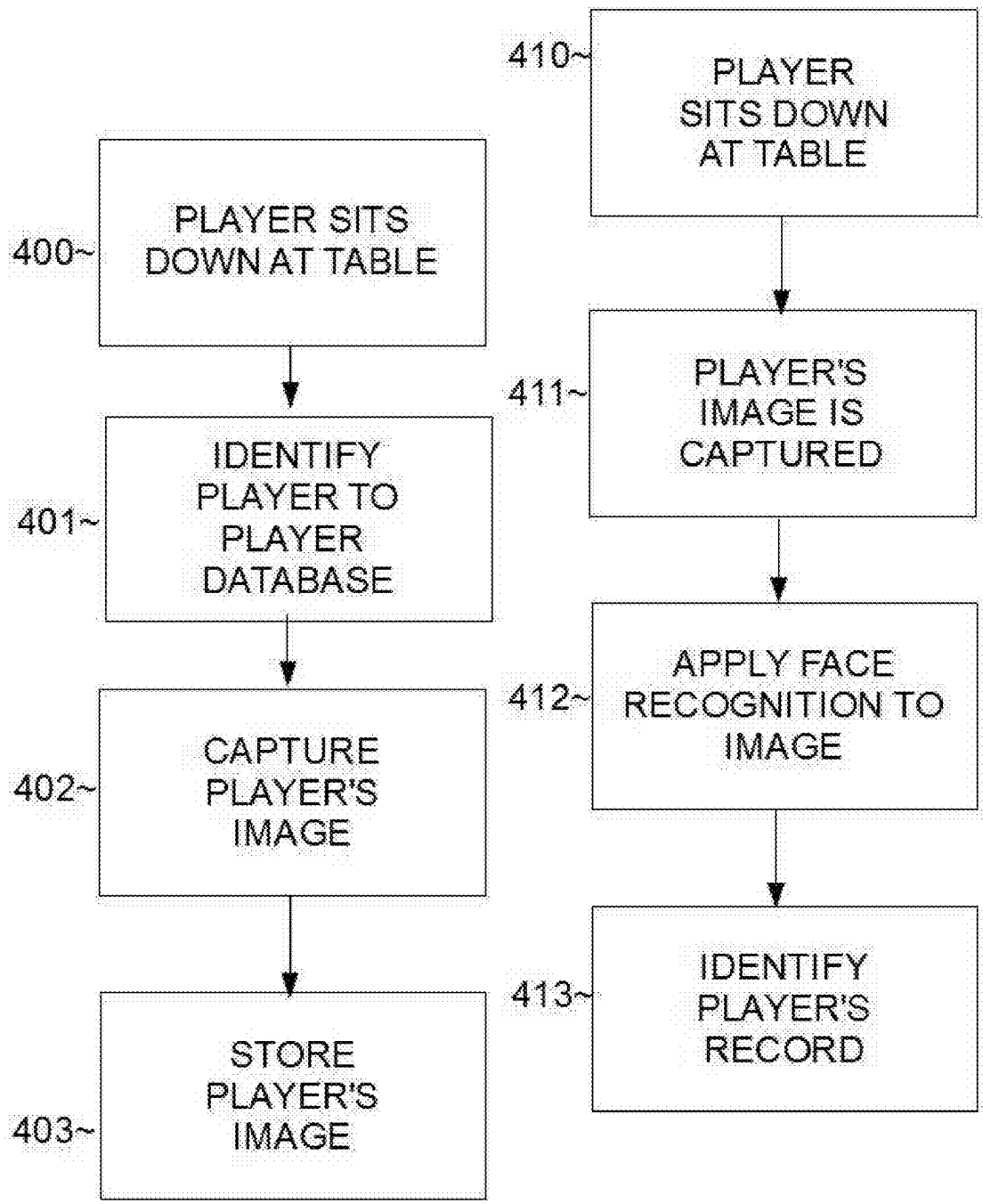
FIG. 4 is a flowchart illustrating a method of identifying players based on their appearance, according to an embodiment.

FIG. 4 is a flowchart illustrating a method of identifying players based on their appearance, according to an embodiment.

The method begins with operation 400, wherein a player sits down at a gaming table.

From operation 400, the method proceeds to operation 401, which identifies the player to the player database. This can be done by the player presenting his/her player's card, which is swiped into a casino computer by a casino employee and from the player's card the player's account number is identified (e.g., it can be electronically stored on the player's card's magnetic strip or other method of encoding). The player's actual seat at the table should be identified to the computer as well.

From operation 401, the method proceeds to operation 402, which captured the player's image via one or more cameras. The image captured would be at the seat identified in operation 401.

From operation 402, the method proceeds to operation 403, which stores the image captured in operation 402 into the player database (or any other database) in the player's account (identified in operation 401). In this way, the player (or other) database now knows the player's appearance.

Operations 400 to 403 are used to populate the database with the player's image so the player can subsequently be optically recognized with the need for the player to actively identify himself (using a player's card or other mechanism). Operations 410-413 are used to identify a player whose image is already in the database (due the operations 400 to 403 already being performed).

Operation 410 begins when a player sits down at a casino gaming table. The method can also be applied to a slot machine, etc.

From operation 410, the method proceeds to operation 411, wherein the player's image is captured from a camera that has a clear view of the player. The image is transmitted to the casino computer/database.

From operation 411, the method proceeds to operation 412, which applies face recognition to the image to identify the individual in the image. The image captured in operation 411 is compared to all of the facial images in the player database to determine if the player is in the player database or not.

If the player's image is in the player database, then the method proceeds to operation 413 wherein the player's identity (and hence the player's account in the player or player database) is identified. At this point, the player's account can be used for any purpose that the player would use a player's card for, e.g., to track the player's play (at a casino table or machine), provide the player incentives, targeted advertisements, etc. Thus, the casino now knows the player's identify (and his/her account number) without the player having to identify himself/herself (by presented or inserting a player's card, etc.)

If in operation 412 the player's image is not found in the player database, then instead of proceeding to operation 413 the method would result in a "failure", that is, the player's image was not located in the player database and thus the player's identity (and account information) cannot be located in this manner.

Figure 5:
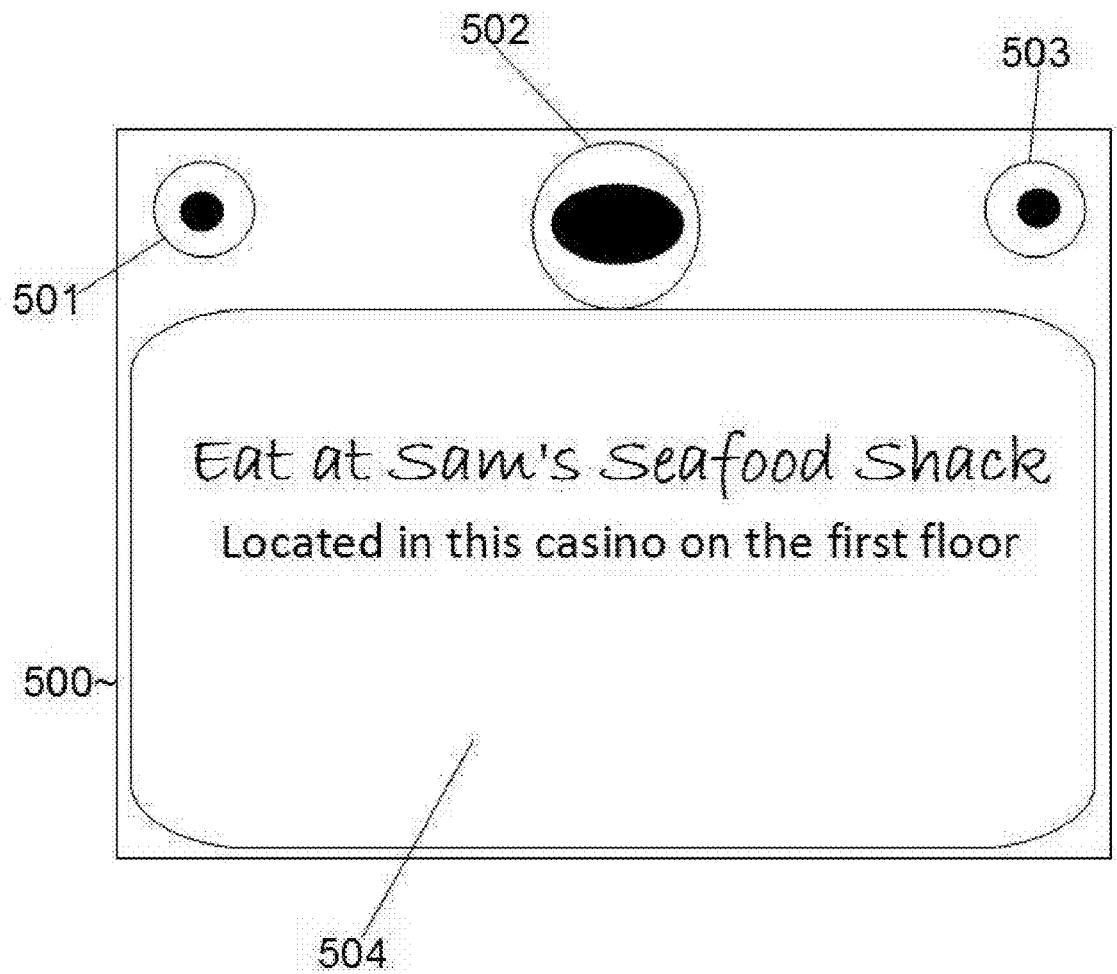
FIG. 5 is a drawing of a table sign with three cameras, according to an embodiment.

FIG. 5 is a drawing of a table sign with three cameras, according to an embodiment.

The sign 500 comprises a stereo first camera 501 and a stereo second camera 503 cooperate to provide the system (e.g., any computer which analyzes the images and communicates the results) a stereoscopic image which can be helpful when recognizing things like stacks of chips at the table. A display 504 (such as an LCD display, etc.) is used to display the dynamic content/advertisements.

A wide angle camera 502 contains a wide angle (wider than the stereo first camera 501 and second camera 503) which is used to capture player images at the table. The wide angle camera 502 is configured to be able to view all players sitting at the table in one image. The player images (note that video is a collection of images, all cameras can capture video which is essentially a collection of images) can be used to apply all sorts of algorithms, such as face detection, age detection, sex detection, gaze detection (whether a player is looking at the sign or not), object detection (e.g., detect what objects (e.g., cigarettes) the players are holding, etc.

Figure 6:
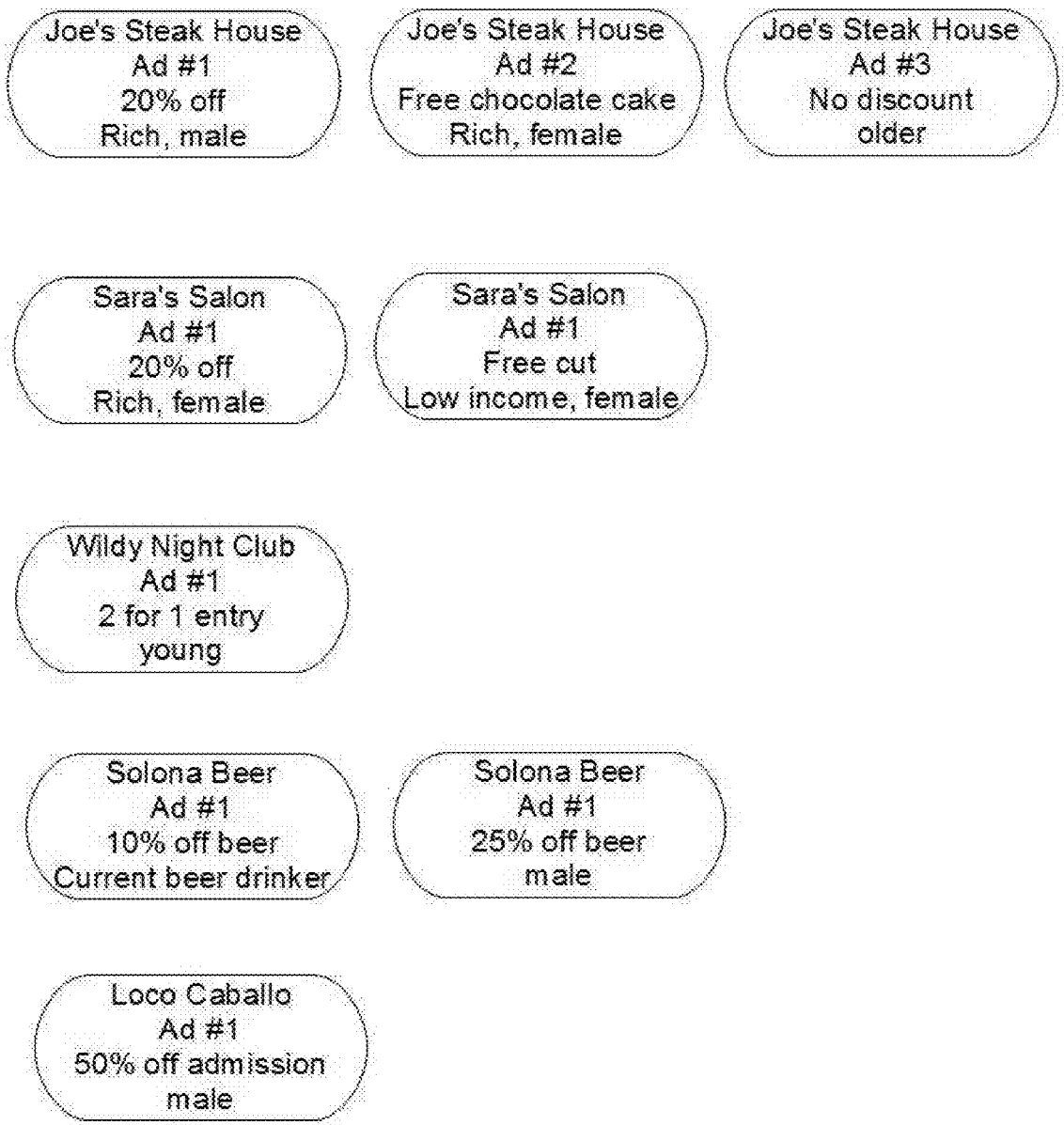
FIG. 6 is a drawing of a exemplary data structure showing different advertisement records, according to an embodiment.

FIG. 6 is a drawing of an exemplary data structure showing different advertisement records, according to an embodiment.

Different advertisements have different aspects that can trigger the advertisement. Some advertisements can also have coupons in the advertisement. A data structure in a computer readable storage medium can store the advertisements and all of their properties.

In FIG. 6, each row represents the same merchant but a different advertisement for that merchant. Advertisements that are displayed on the table sign can be selected based on the player aspects at the table (although some advertisements can also be displayed regardless of the player aspects). Different advertisements can exist for the same merchant and product (with the same or different coupon terms) and the particular advertisement shown can be selected based on which has properties which have a best match with the player aspects at the table. For example, if a table is determined to be predominantly rich female, then the advertisement for Joe's Steak House that is shown is Ad #2 which would visually appeal to women (e.g., the advertisement can depict women and/or good looking men) and offer a coupon for a free chocolate cake (a product which would appeal to women). This is in contrast to if the table is predominantly rich males, then the advertisement that is shown is Ad #1 which would visually appeal to men (e.g., the advertisement can depict good looking woman) and provide a discount (20% off) that would appeal to men.

In this way, it can be determined (based on the aspects at the table) which merchants will have advertisements that will be displayed and also which particular advertisements for those merchants will be displayed.

The determination of which advertisements to display at each sign can be performed by the advertisement database 304 (or other remote server/database connected to the system) which would receive all the data about the players at each table, and the respective advertisements are transmitted to each respective table sign so that they can be displayed therein. Note that the advertisement database 304, and/or the player database 305, or another database/server that is connected to the system (where the advertisement database is connected to) can coordinate and perform any and all of the methods and features described herein.

Table I below represents a sample of aspect data that can be ascertained from a table. The source of this date can be both the casino player database and from visual information. Each aspect can be broken into categories, for example sex can be either male or female. Age can be broken into categories: <30, 30-40, 40-50, 50-60, >60. Income can be broken into categories: very high ($200 k+), high ($100 k-$200 k), moderate ($75 k-$100 k), low ($50 k-$75 k) and very low (<$50 k). Marital status can be single or married. Dinning pattern can be frequently (visited over 20 hotel restaurants in past year), moderate (visited from 10 to 20 hotel restaurants in past year), infrequent (visit from 1 to 10 hotel restaurants in past year), and none (0 visits in past year). Current game represents how the player is currently doing in the table game (very high win means the player is winning over $2,000, winning a lot means the player is winning from $500 to $2,000, winning means the player is winning from $25 to $500, even means the player is winning from −$25 to $25, losing means the player is losing from −$200 to −$25, and losing a lot means the player is losing more than $200. Note that the data from some players can be retrieved from the casino player database (e.g., players 1, 2, 4, 6) which contains more complete data than from visual observation. For players that cannot be located in the casino player database (e.g., they do not use a comp card and their appearance does not result in a located record about them) then purely visual data can base used to determine some of their data. For example sex and (to some extent age) can typically be ascertained from visual imaging, and so can how they are doing in the current game (winning a lot, losing, etc.)

TABLE I

| Player# | sex | age | income | marital status | dining pattern | current game |
|---|---|---|---|---|---|---|
| Player 1 | M | 30-40 | very high | single | frequently | winning a lot |
| Player 2 | M | >60 | high | married | infrequent | losing |
| Player 3 | F | <30 | unknown | unknown | unknown | winning a lot |
| Player 4 | F | 40-50 | low | married | infrequent | even |
| Player 5 | M | <30 | unknown | unknown | unknown | losing a lot |
| Player 6 | M | 40-50 | high | single | moderate | winning |
| Player 7 | F | unknown | unknown | unknown | unknown | very high win |

There are numerous ways that a table's aspects can be computed (see operation 101). In a first method, a table's aspect can be all categories that all players fall into at a table. For example, using this method, the tables aspects would be (sex=M, sex=F, age=30-40, age=>60, age=<30, age=40-50, age=<30, age=40-50, income=very high, income=high, income=low, marital status=single, marital status=married, dinning pattern=frequently, dining pattern=infrequent, dining pattern=modern, current game=winning a lot, current game=losing, current game=even, current game=winning, current game=very high win). Thus, any advertisement shown which matches the table's aspects would have at least one player that is compatible. For example, in this example table, even though there is only one person over sixty years old, an ad can be shown which is targeted for 60+ year olds (e.g., for a retirement home).

In another method to determine a table's aspect, a majority of player's at the table would have to share that aspect. Thus, for example, using this method, the table's aspect would be: (sex=M, age=<30, age=40-50, income=high, marital status=married, marital status=single, dining pattern=infrequent, current game=winning a lot). Note that if there is a tie for the majority (for example, this table has 2 singles and 2 marrieds) then both categories can be includes (although in an alternative embodiment neither would be included).

In a further embodiment, a particular player at the table aspects would only be used. For example, there is a very rich player at the table (e.g., Player 1), then only his aspects would be considered the table's aspects, so that they would be (sex=M, age=30-40, income=very high, marital status=single, dining habits=frequently, current game=winning a lot). This method can be applied to the richest (known) player at the table or to a particular player that the casino system happens to know is very rich. In the alternative, the player who is winning the most can be the relevant player and his/her aspects can be used as the player aspects (e.g., player 7).

Once the table's aspects are determined, then advertisements can be determined which are a match for the table's aspects (operation 102). An advertisement's properties are tags associated with each advertisement based on the targeted audience that the particular advertisement would be the most effective (see FIG. 6, for example Ad #1 for Joe's Steak house has properties rich, male). This can also be determined in numerous ways. Such methods can include: 1) an advertisement's properties must be an exact match to the table's aspects; 2) an advertisements properties must be a subset of the table's aspects; 3) The table's aspects must be a subset of the advertisement's properties; 4) at least one of the table's aspects must match one of the advertisement's properties; or any other method involving a comparison between the table's aspects and the advertisement's properties.

Or the advertisements can be ranked based on their degree of match between their properties and the table's aspects. For example, for every aspect of a table that matches an advertisement's properties would count as one point, and a tally of points can be added up for each advertisement relative to each table. Then the highest ranked advertisements can be shown to the table.

Each time someone at the table leaves or someone new joins, then the table's aspects can be recomputed and the algorithm to choose advertisements can be initiated again to choose a new set of advertisements to display.

In a further embodiment, when an advertisement is being displayed, a "wireless coupon" can also be offered to patrons nearby. This can be done while an advertisement is being displayed by simultaneously broadcasting a coupon using near field communication (e.g., Bluetooth, Wi-Fi, etc.) to transmit the existence of a coupon to patrons nearby with active devices (e.g., cell phones, tablets, etc.) that are enable to receive such coupons. Such a device can be enabled to receive such coupons in numerous ways, such as having an app installed and active on it that is constantly looking for NFC beacons to identify such coupons. A cell phone can be set to automatically pick up a NFC beacon (a signal sent by a device to all nearby devices that wish to communicate with it) via its settings configured by the user. NFC is an abbreviation for near field communications and is a communications technology used to transmit data across short distances. NFC is a set of standards for smartphones and other devices (e.g., tablets, etc.) to establish radio communications with each other when they are in close proximity with each other (e.g., a few centimeters).

An example of how a wireless coupon could work is as follows. An advertisement appears on the digital sign (selected using any of the methods herein such as using the composition of the players at the table). The advertisement (e.g., for "Joe's Steak House") would also display a coupon (e.g., "10% off"). A patron who wants to take advantage of this wireless coupon could then take out his or her wireless device (e.g., cell phone, tablet, etc.) and press a button (e.g., activate an app or go into the device's settings to view possible signals to connect to) and see a list of available signals to connect to (which would include the beacon for the Joe's Steak House coupon). The user can then press an icon on the device to receive the particular coupon and the coupon would be downloaded to the player's device. A serial number (and optional bar code) would also be displayed as part of the coupon. The player can then present this coupon to Joe's Steak House who will scan in the serial number and bar code to authenticate the coupon, and once authenticated, can then provide the player the discount.

In a further embodiment, instead of the player having to physically present his physical players card (which is the size of a credit card and contains the player number (human readable) printed on the card as well as a machine readable version of the player number (e.g., QR code, magnetic stripe, etc.)) to the casino staff (so that the player can be identified), the player's card can exist electronically as a "virtual player's card' on the player's device (e.g., cell phone, etc.). The player can press a button on his device which would bring up the player's club information (e.g., QR code) which can then be scanned by casino personnel/ employee (or scanner at the table) so the player's identity can be determined. Or, the player's virtual card can send a wireless signal (e.g., Bluetooth, NFC, Wi-Fi, etc.) identifying the player to nearby devices so that the player's identity is known to the casino system.

Coupons on the player's device can also be redeemed directly at the casino table using NFC (or other wireless technology such as Bluetooth, Wi-Fi, etc.) Thus, if the player has virtual coupons for play (e.g., free $5 match play coupon, etc.) on his player device, these can be redeemed directly at the casino table.

Figure 7:
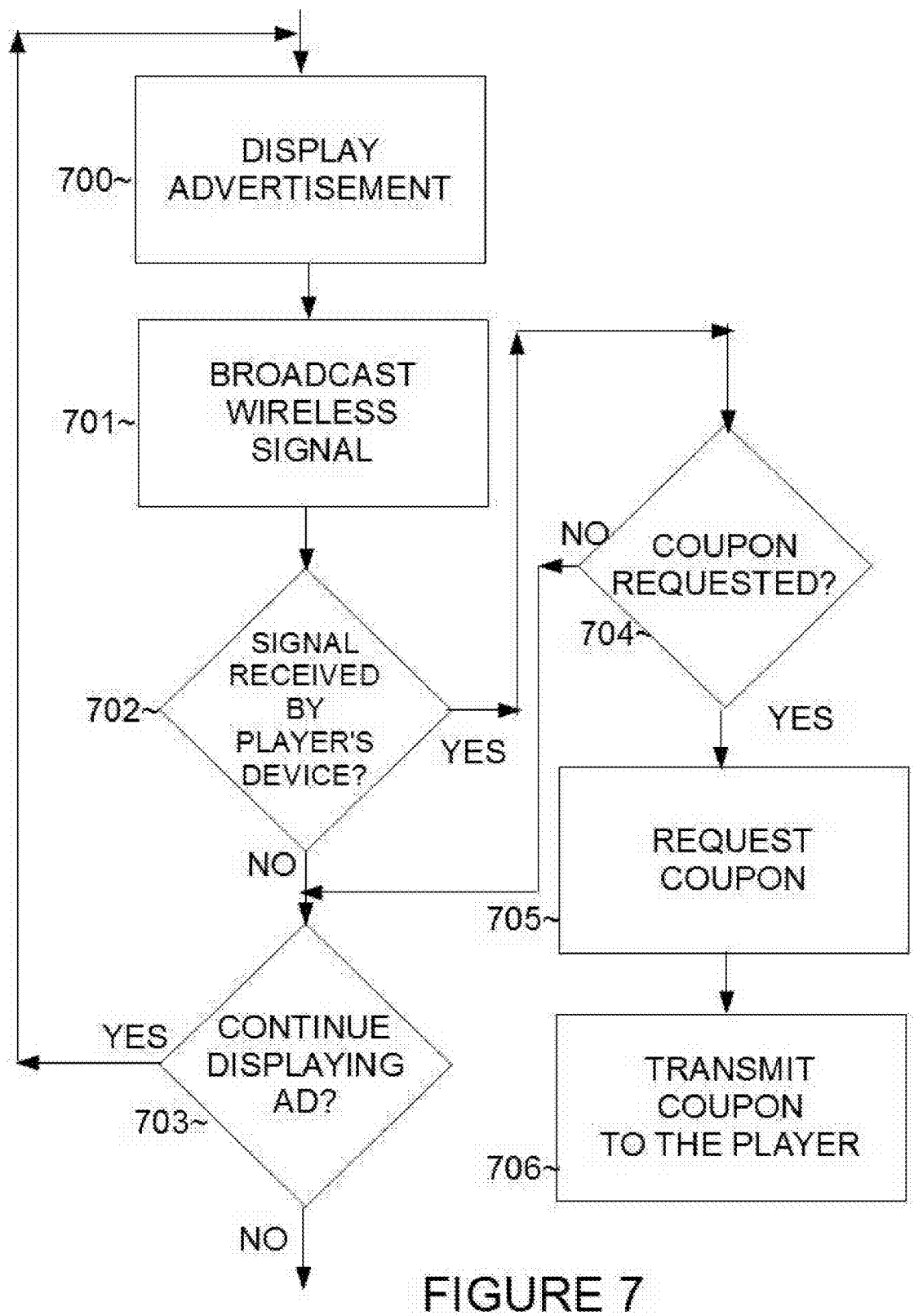
FIG. 7 is a flowchart illustrating an exemplary method of implementing a method to transmit and receive wireless coupons, according to an embodiment.

FIG. 7 is a flowchart illustrating an exemplary method of implementing a method to transmit and receive wireless coupons, according to an embodiment.

The method can begin with operation 700, in which the sign displays an advertisement. This can be done as described herein.

From operation 700, the method proceeds to operation 701, which broadcasts a wireless signal. The wireless signal would be a beacon for a wireless coupon which is displayed on the sign. Typically, players who see an advertisement/ coupon they like on the sign will wave their portable device (e.g., cell phone, etc.) near the sign in order to wirelessly receive the coupon. The player may or may not (depending on their device) have to press a button on their device in order to receive the coupon (i.e., the exchange can be manual or automatic).

From operation 701, the method proceeds to operation 702, which determines (on the player's portable device) if a signal (beacon) has been received.

If no signal has been received at a player's device in operation 702, then the method proceeds to operation 703 which determines whether to continue displaying the advertisement (from operation 700) or not. Each advertisement can be displayed for a predetermined amount of time (e.g., 15 seconds) upon which a new advertisement can be displayed, or alternatively instead of an advertisement a casino message can be displayed. If the sign is to continue displaying the advertisement then the method returns to operation 700.

If in operation 703 it is determined not to continue displaying the same advertisement, then the method can proceed to a further operation (not pictured) which either chooses a new advertisement (upon which the method returns to operation 700), displays a casino message (e.g., information about the game), or nothing at all.

Typically, a number of different advertisements (e.g., 2-10 or more) can be cycled through via operations 700 to 703.

In operation 702, if a signal is received by a player's device, then the method proceeds to operation 704 which determines if a coupon is requested from the player's device. When the player's device receives the signal (beacon) sent in operation 701, if the player wants the coupon then the player can indicate this by pressing a button on the player's device (or it can happen automatically) which then proceeds to operation 705.

If in operation 704, the coupon is not requested then the method returns to operation 703.

If in operation 704, it is determined that the coupon is requested, then the method proceeds to operation 705, wherein the player's device requests the coupon offered from the sign in operation 701 and the player's device transmits this request to the sign.

From operation 705, the method proceeds to operation 706, wherein the sign would receive the request from operation 705 and then respond by transmitting the coupon to the player's device.

Figure 8:
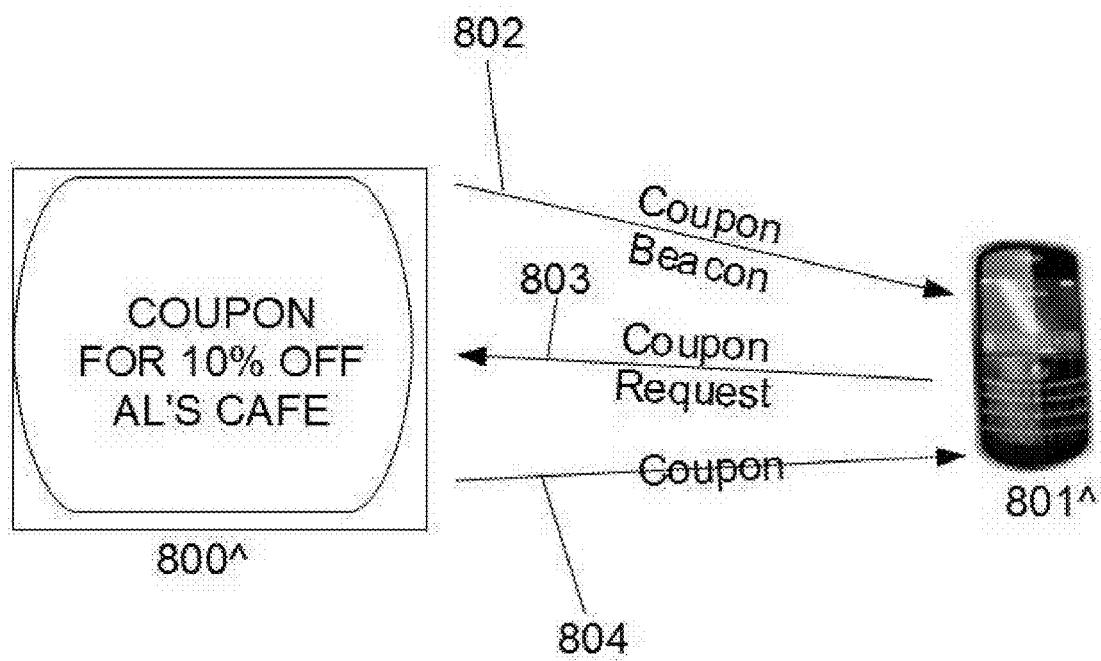
FIG. 8 is a flow diagram illustrating a communication protocol between the sign and the player's device, according to an embodiment.

FIG. 8 is a flow diagram illustrating a communication protocol between the sign and the player's device in order to distribute a coupon to a player, according to an embodiment.

A digital sign 800 displays a digital coupon. A player's device 801 such as a cell phone is used to receive the digital coupon.

First, a coupon beacon 802 is broadcast (see operation 701) from the sign 800 to a nearby radius using any near-field technology (e.g., Wi-Fi, etc.) The cell phone 801 receives the broadcast 802 and responds back (see operation 705) with a coupon request 803. The sign 800 receives this response back and then responds (see operation 706) in turn with the actual coupon 804. Of course the actual coupon 804 is not a physical coupon but a wireless signal that encapsulates the terms of the coupon (e.g., the merchant, discount, redemption period, coupon serial number, etc.)

Note that each coupon transmitted to a player's device is unique because it has its own serial number and thus each coupon is targeted to an individual player's device. Thus, for example if three player devices all receive the same coupon beacon and they all send back their own coupon request then the sign would respond with three coupons, one for each of the player devices. Each coupon would contain the same terms but would have a different serial number.

Note that the sign would also record each coupon it distributed and an identification of the player device that requested it. A list can be generated of coupons distributed for each coupon/advertisement shown on the sign and this list can be distributed (wirelessly via a computer communications network) to the merchant who is the subject of the coupon. In this way, the merchant would know how many coupons are outstanding.

Table II below illustrates an exemplary list of coupons distributed maintained by the sign (and any other computer/ server in communication with the sign).

TABLE II

| Date | Time | Advertisement ID | Coupon ID | Recipient | Recipient ID # |
|---|---|---|---|---|---|
| Mar. 3 | 13:21 | 03111 | 0001 | John Smith | 44322 |
| Mar. 3 | 15:44 | 03111 | 0002 | Joe Brown | 45543 |
| Mar. 3 | 19:04 | 03111 | 0003 | Bill Bobb | 44324 |
| Mar. 4 | 00:21 | 03111 | 0004 | unknown | ????? |
| Mar. 4 | 2:03 | 03111 | 0005 | Jack White | 04418 |

Note that the date and time columns represent the date and time that the coupon was actually transmitted. The Advertisement ID column represents an identifier representing a particular advertisement (each advertisement has its own advertisement ID). "Advertisement" refers to an advertisement shown on the sign which also can be considered a "coupon" (e.g., the advertisement says 10% all haircuts at Joe's cuttery). Instead of "Advertisement ID", "Coupon ID" could be used as well. The recipient is the name of the player that owns the player device that has received the coupon. This can be ascertained by the coupon request 803 (operation 705) which would (in an embodiment) transmit the identity of the requesting player (the requesting player's name and/or his player ID#). The player ID# is in the recipient ID# column and refers to the player's account number in the casino's player database (each player can have an account in the player database 305 and has a unique account number to identify the player). Note that players who register with the system to receive wireless coupons can also have accounts in the advertisement database 304 which can contain separate information from the player database 305 which is typically maintained by the casino. The advertisement database 304 can be maintained by the party who operates the digital signs and distributes the software (apps) allowing players to download the coupons.

In this manner, the merchant whose coupon is being displayed (e.g., "Joe's Steakhouse") can (electronically, e.g., via email, etc.) receive the list of coupons that were given out by table signs in the past day (or two days, etc.) This way, the merchant knows who to expect to come redeem coupons. Coupons can also have an expiration date (e.g., "good only for the next 48 hours)" and will expire after the duration after the coupon was issued to the player. Each coupon also has a unique serial number that is encoded in the transmission to the player's device. The coupon can be transmitted using any protocol used for the transmission of wireless data.

Note that coupon 0004 does not have a player identified. This is because the player who received coupon 0004 did not have a player account with the casino or did not have any way of identifying himself/herself to the sign. In one embodiment, all players who receive coupons must have identified themselves (e.g., by registering with the couponing system or by being required to have a player's account with the casino to receive coupons). In another embodiment, players can receive coupons anonymously. In this embodiment, the system does not know the player's identify but the player can still redeem the coupon in the same manner as any other player.

Note that data can be gathered and stored about unidentified players who receive coupons. For example, their appearance can be determined (e.g., height, hair color, eye color, photograph, visual age, sex, etc.) via the camera using image recognition. This data can then be stored and associated with this player so that the merchant still has some information about the player who received the coupon. For example, instead of using "?????" as the recipient ID for coupon 0004, a new unique id (can be generated (e.g., "UP00001" which stands for "unknown player") and this can be associated with any data that can be garnered about the player. Such data can include any data related to the player's appearance, friends they are with, and also data about their play (e.g., their buy-in, average bet, amount colored up, etc.)

Figure 9:
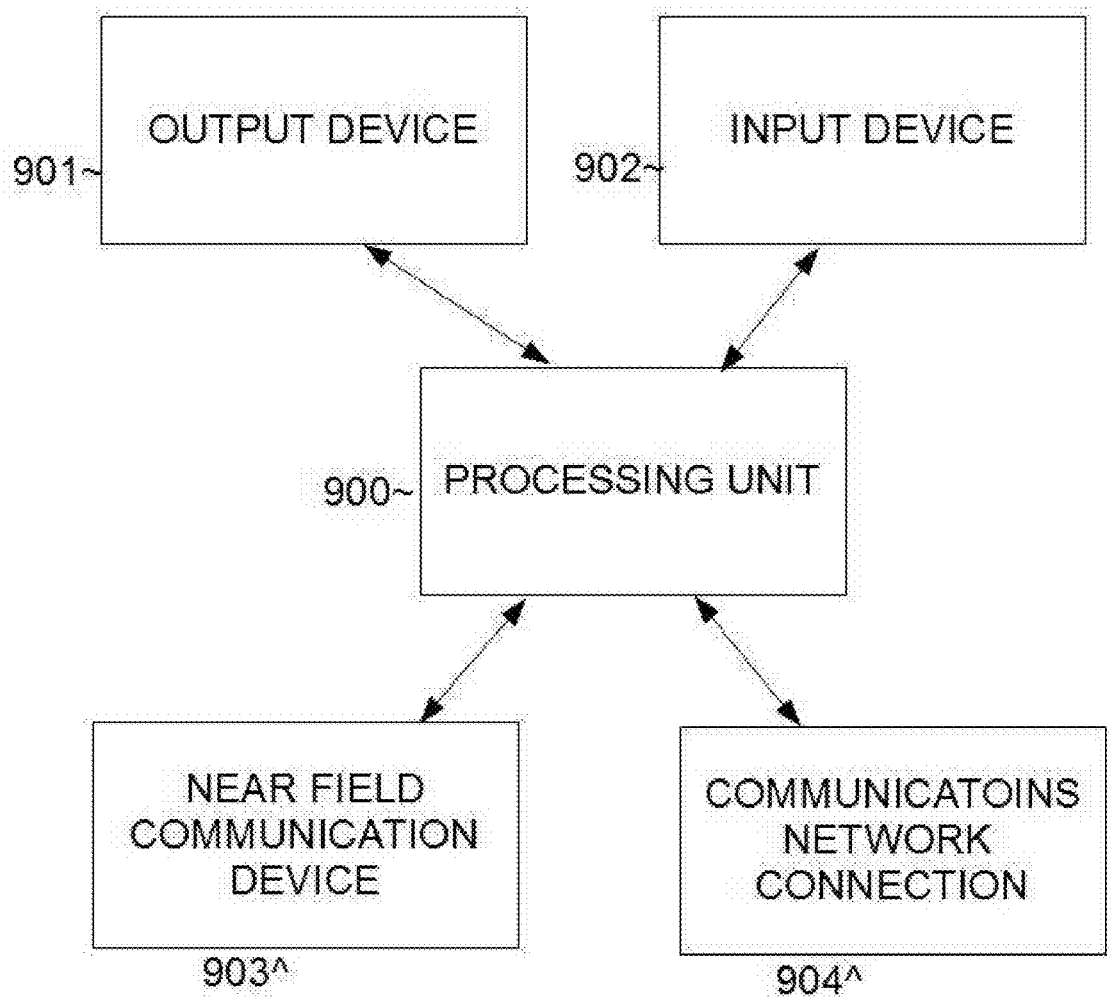
FIG. 9 is a block diagram of an electronic sign with wireless couponing capability, according to an embodiment.

FIG. 9 is a block diagram of an electronic sign with wireless couponing capability, according to an embodiment. The device illustrated in FIG. 9 can be used to implement any of the methods/features described herein.

A processing unit 900 can be a microprocessor and associated structure (e.g., bus, cache, etc.) which is connected to one or more output device(s) 901 (e.g., an LCD, etc.) which is used to display the advertisements, coupons, game information, and any other information that can be displayed. The processing unit 900 is also connected to one or more input device(s) 902 (e.g., buttons, switches, etc.) which can be used to set parameters on the sign (e.g., brightness, mode, etc.) The processing unit 900 is also connected to a near field communication device 903 (e.g., Bluetooth, Wi-Fi, etc.) so that it can communicate with nearby player devices. The processing unit 900 also has a communications network connection 904 which can connect the processing unit 900 to a computer communications network such as the internet, casino local area network, etc. Not pictured in FIG. 9 is a ROM and RAM both connected to the processing unit 900 that the processing unit 900 can access. The processing unit 900 can execute instructions which implement any method or feature described herein. The ROM and/or RAM can store programs which, when executed, control the processing unit 900 to execute any of the methods/features described herein. Also not shown and connected to the processing unit 900 is a non-transitory storage device (e.g., disc drive, etc.) which can read a non-transitory storage medium (e.g., disc, etc.) which can store programs which when executed would direct the processing unit 900 to implement any of the methods/features described herein.

In an embodiment, in addition to the output device 901 located on the front of the sign (which is what would be visible to the players at the table where the sign is located/affixed to), a second output device (also an LCD, etc.) can be located on the back of the sign and also connected to the processing unit 900. In this way, both displays (front, back) can be controlled by the processing unit 900 and can display different content. The front display would typically display the advertisements/coupons, while the rear/back display would display information for the casino personnel (but not intended for players to see). Both displays can be touch-screens, or just the rear display can be a touch-screen. Casino personnel can manipulate the rear display by touching a graphical user interface programmed on the sign in order to change settings (e.g., brightness, table limits, etc.), change operational settings, initiate coupon transmission to a player device, etc.

Note that the structure illustrated in FIG. 9 and described can also be used to implement a coupon reader, according to an embodiment. A coupon reader is a device that would be located at the physical merchant (e.g., the restaurant, shop, etc.) where the person who wants to redeem the coupon would report. The coupon reader would wirelessly read the coupon and validate it to the personnel at the merchant location. For the coupon reader, the output device 901 would be a LCD or CRT display (or any other such display) but not necessarily on a sign. The input device 902 would typically be a standard keyboard. Thus, the coupon reader would typically be a standard personal computer (keyboard, monitor, etc.) with a near field communication device in order to validate coupons.

Figure 10:
FIG. 10 is a drawing of an electronic sign displaying a coupon and a cellular phone receiving the coupon, according to an embodiment.
Figure 10:

FIG. 10 is a drawing of an electronic sign displaying a coupon and a cellular phone receiving the coupon, according to an embodiment.

A digital sign 1000 displays an advertisement (also referred to as a coupon or digital coupon) for a merchant ("Joe's Steakhouse"). The digital sign 1000 is programmed to cycle through many different such advertisements, each such advertisement can have its own digital coupon that each player can receive wirelessly if they so wish.

A player device (also referred to as portable device) such a cell phone 1001 receives the digital coupon wirelessly from the sign 1000. Of course what is received from the sign are wireless signals representing data which describes the coupon. To redeem the coupon, the player can take the device 1001 to the merchant and wave it near a coupon reader (not pictured) which can read wireless signals and communicate with the device 1001. Either the coupon can be redeemed automatically (the portable device receives a beacon from the coupon reader and automatically transmits information regarding the coupon that coincides with the merchant, and then the coupon reader can display the player's coupon number and validate the coupon so personnel at the merchant can then provide the discount. Alternatively, a redeem button 1002 can be present on the player device (the button is of course a virtual button the device screen) that when pressed initiates the communication sequence illustrated in FIG. 11. This information is then used to validate the coupon.

Figure 11:
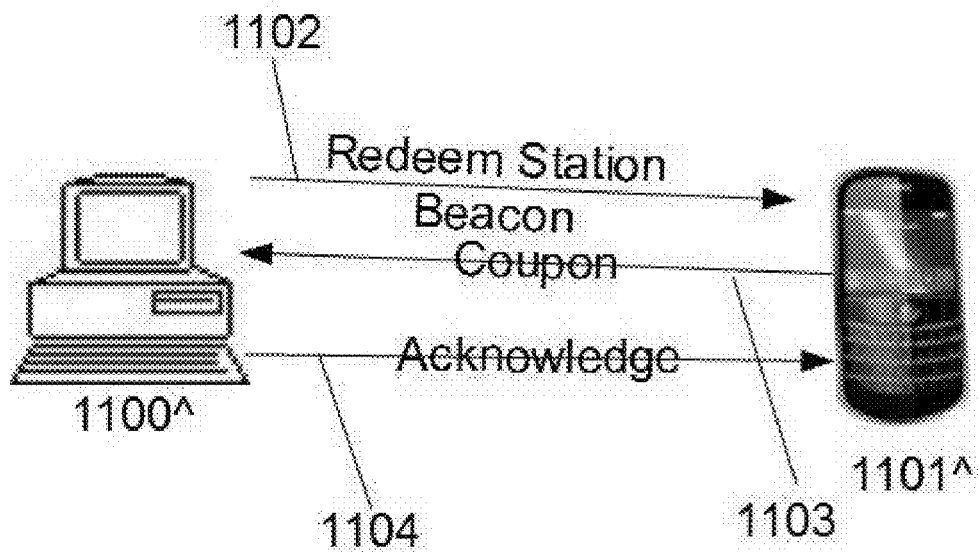
FIG. 11 is a block diagram of a coupon reader, according to an embodiment.

FIG. 11 is a flow diagram illustrating a communication protocol between a coupon reader and the player's device in order to redeem a coupon from a player, according to an embodiment. As in FIG. 8, all exchanges of information occurs wirelessly.

A coupon reader 1100 has a near field communication device (not pictured). The coupon reader 1100 broadcasts a redeem station beacon 1102 to any device nearby that is "listening." A player's device 1101 receives this signal and in response transmits the coupon to the coupon reader 1100. The coupon transmitted contains the information needed for the coupon reader 1100 to identify the record for the coupon in the advertisement database 304. This can be the coupon number or any other information to uniquely identify the coupon. The record for the coupon should typically be verified so that it can be concluded that the coupon being transmitted is not "counterfeit", that is, it was legitimately received by the player from the table sign as described herein. When the coupon reader 1100 receives the coupon from the player's device 1101, it can send an acknowledgement 1104 to the player's device 1101 so that the player's device knows the coupon was received, otherwise the player's device 1101 can resend the coupon again.

Figure 12:
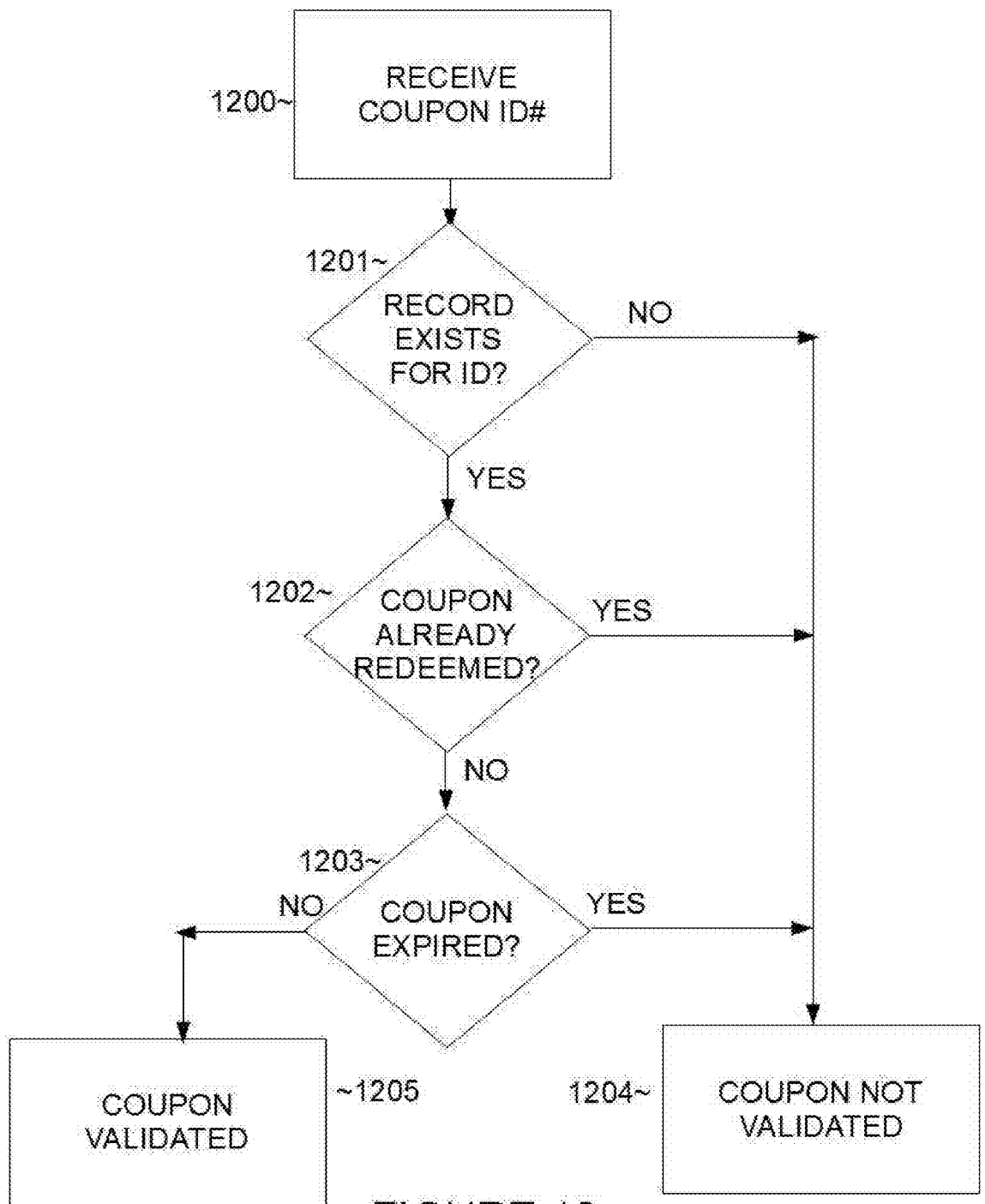
FIG. 12 is a flowchart illustrating an exemplary method of validating a wireless coupon, according to an embodiment.

FIG. 12 is a flowchart illustrating an exemplary method of validating a wireless coupon, according to an embodiment.

The method can begin with operation 1200, which receives the coupon ID # from the player's device. This can be embedded in the coupon 1103 signal.

From operation 1200, the method proceeds to operation 1201, which determines whether a record exists for that coupon ID in the advertisement database 304. The advertisement database 304 stores all of the coupons that have been issued and all of their parameters. If there is no such coupon, then this coupon is not authentic (either there was some type of communication error or the coupon was generated by the player without receiving it in an authorized manner ("counterfeit") and the method proceeds to operation 1204 wherein the coupon is not validated. A message on the output device to the coupon reader 1100 will indicate that this coupon cannot be validated and thus the player presented the coupon on the player's device would not be entitled to the coupon.

If in operation 1201, the record for the coupon ID exists in the advertisement database then the method proceeds to operation 1202 which determines whether the coupon has already been redeemed. This information would be in the record associated with the coupon ID. If this particular coupon has already been redeemed, then of course it cannot be redeemed again and a message to this effect is displayed on the coupon reader and the method proceeds to operation 1204.

From operation 1202, the method proceeds to operation 1203, which determines whether the coupon has expired. This can be done by retrieving the coupon's valid period from the record in the advertisement database and comparing it to the current time. If the coupon has expired then a message to this effect is displayed on the coupon reader and the method proceeds to operation 1204.

If in operation 1203, it is determined that the coupon has not expired, then the method proceeds to operation 1205, wherein the coupon is validated. A message is displayed on the coupon reader that the coupon is valid and the record in the advertisement database is updated to reflect that this coupon has been redeemed (and thus cannot be redeemed again). This coupon in the player's device can also be removed so that the player cannot try to redeem this coupon again. Alternatively, the coupon does not have to be removed from the player's device but when displayed it will be stamped with "already redeemed" so that the player knows he/she cannot redeem it again. If the player tries to redeem a coupon that was already redeemed, it would not be validated by the system and the casino personnel would indicate to the player that their coupon is not valid and would not provide the player the benefit of the coupon.

Figure 13:
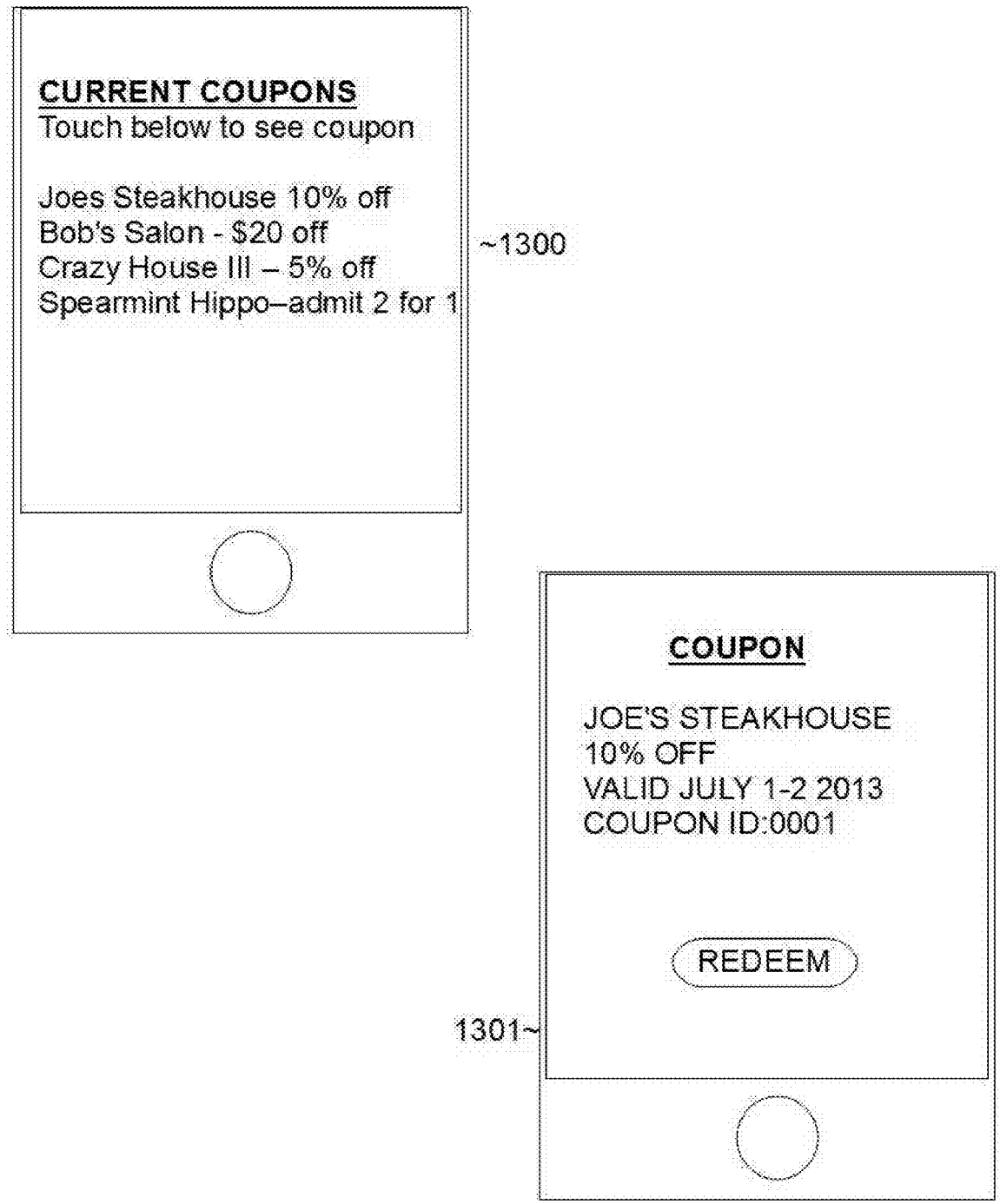
FIG. 13 is a drawing of a portable device interface, according to an embodiment.

FIG. 13 is a drawing of a portable device interface, according to an embodiment.

An 'app' (short for application) can be downloaded to a player's portable device (e.g., cell phone, tablet, etc.) which can manage the communications to receive and validate coupons as well as provide the player an interface to access his/her coupons.

A coupon list screen 1300 is a screen/window which displays the player's current available coupons. All of the coupons in the list have been received using any of the methods described herein. The player is free to touch any of the coupons to bring up an individual coupon screen 1301.

Individual coupon screen 1301 is a screen/window which displays the details for the particular coupon (e.g., actual discount or terms, period it is valid, a coupon ID, the name of the merchant, location of merchant, and any other information related to the coupon.

In a further embodiment, if a player has obtained and redeemed a coupon for a particular merchant/advertiser, then when that player sits at a table again, another advertisement for that particular merchant/advertiser can be deliberately displayed (see operation 102). For example, if Sally has obtained and redeemed a wireless coupon for Joe's Steak House, when Sally sits down again at a gaming table, another advertisement for Joe's Steak House can be deliberately displayed.

In another embodiment, each potential advertisement is scored and the highest scored advertisements will be displayed at each particular table. The fact that a player at the table has already redeemed a coupon for an advertiser in the database would increase the score for advertisements sponsored by that advertiser. For example, since Sally has already redeemed the wireless coupon for Joe's Steak House, other advertisements for Joe's steak house would have their score increased as long as Sally remains at the table. Once Sally leaves the table, these particular advertisements would no longer have their score increased.

The system can provide each advertiser with a report as to the aspects regarding each advertisement and its actual audience. The audience comprises the players who were at a table when a particular advertisement has been displayed.

Over time, a particular advertisement would be displayed numerous times at different tables in the same casino and in different casinos and the aspects of its audience can be stored and tabulated. As stated herein, the aspects comprise characteristics of players e.g. their marital status sex income etc. Since advertisers typically pay for their advertisements to be displayed on the sign, they would benefit from having a comprehensive report of each of their advertisements and the audience may have respectively been displayed to.

Figure 14:
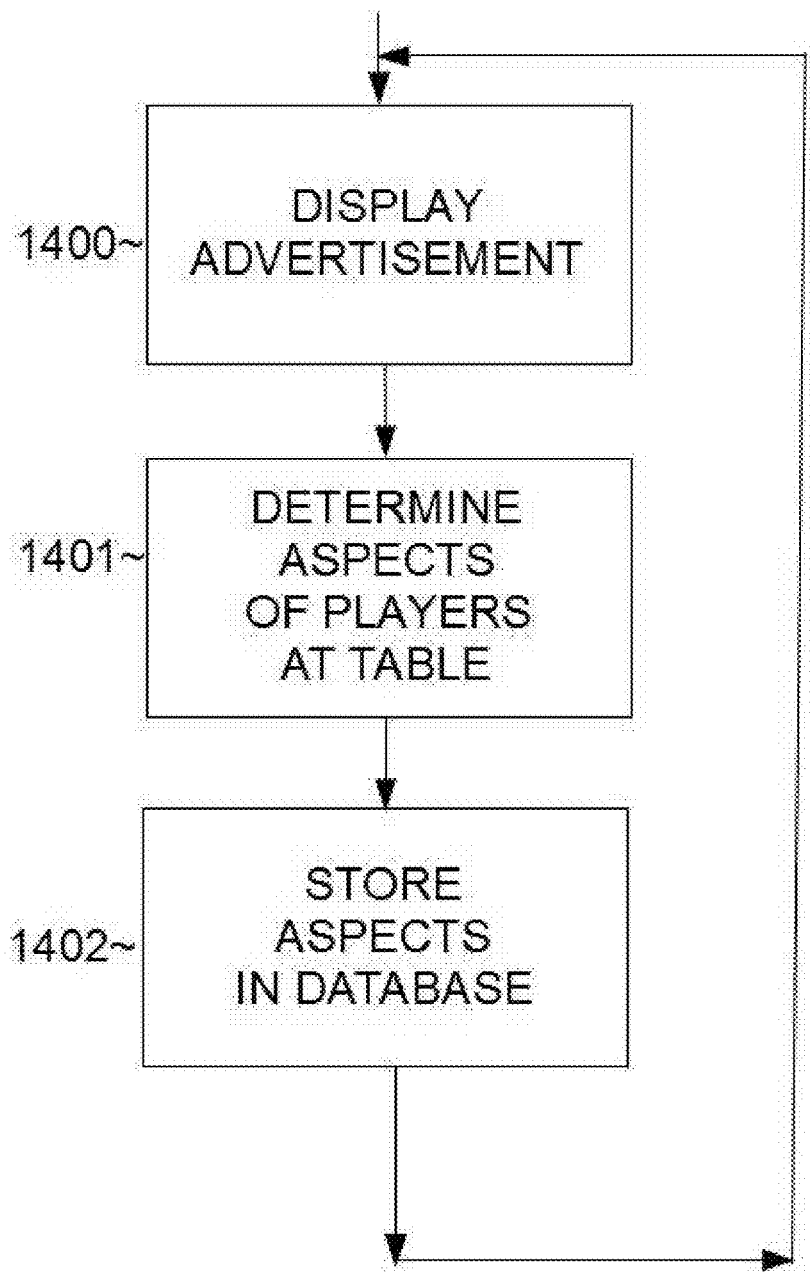
FIG. 14 is a flowchart illustrating an exemplary method of generating an audience histogram, according to an embodiment.

FIG. 14 is a flowchart illustrating an exemplary method of generating an audience histogram, according to an embodiment.

In operation 1400, the sign displays an advertisement. This can be done as described herein. Advertisements can be displayed on signs anything casino or in different casinos, and even in different states. All such advertising is networked together and can be part of the same system.

From operation 1400 the method proceeds to operation 1401 which determines aspects of players at the table. This can be done as described herein for example the cameras on the sign can optically recognize the players at the table and their aspects, or the likenesses of players can be determined and their aspects can be determined from the player database. In some cases aspects of players would not be able to be determined, for example the income of players who are unknown to the system would not typically be able to be determined. In instances where aspects are unknown, then the fact that the aspect is unknown is reflected.

From operation 1401 the method proceeds to operation 1402 wherein the aspects from operation 1401 are stored in the database. In this manner, for each advertisement that is displayed, aspects of the players at the table at the time the advertisement was displayed are added to the database. In this manner, the database stores aspects of players who were at a table when each particular advertisement was displayed.

From operation 1402 the method can return to operation 1400 wherein additional advertisements are displayed.

FIG. 15 is a drawing of an example audience statistics tabulated for a particular advertisement, according to an embodiment.

A tabulation of data can be displayed for each unique advertisement. This data can be transmitted to each advertiser so that each advertiser can view the performance of each of their advertisements. Advertisement statistical window 1500 shows the statistics (e.g. aspects) for advertisement number three, which is a particular advertisement for Joe's Steak House. Such a report can be generated for a particular period in time. The report can comprise any aspects which are known or can be discerned by the system for example the number of times that the advertisement has been displayed, the breakdown of players at the table when the advertisement was shown for categories such as sex, age, income, marital status, dining pattern, and anything else.

Since advertisers are paying to display their advertisements on the signs, the advertisers would expect that the aspects shown in the statistical window 1500 would reflect the advertisers target audience for that advertisement.

A feature that can be implemented on a camera is "gaze detection", which is described in U.S. patent publications 2013/0135198 and 2012/0295708, both of which are incorporated by reference herein in their entireties. Gaze detection can detect when a person within the field of a camera is looking at the camera (or in a particular direction). Thus, gaze detection can be used in order to determine whether a player is looking at the sign or not when an advertisement is playing. This can be helpful because if one or more players at a table are not looking at the sign when an advertisement is playing, then the advertisement is ineffective as to those players who are not looking. Thus, if all or some players (e.g., a majority of players at the table) were not looking when an advertisement was played, the advertisement can be re-played (immediately thereafter or later on) so that players who were not watching when the advertisement was played can have a chance to see it. Gaze detection algorithms are known in the art and available commercially.

Figure 16:
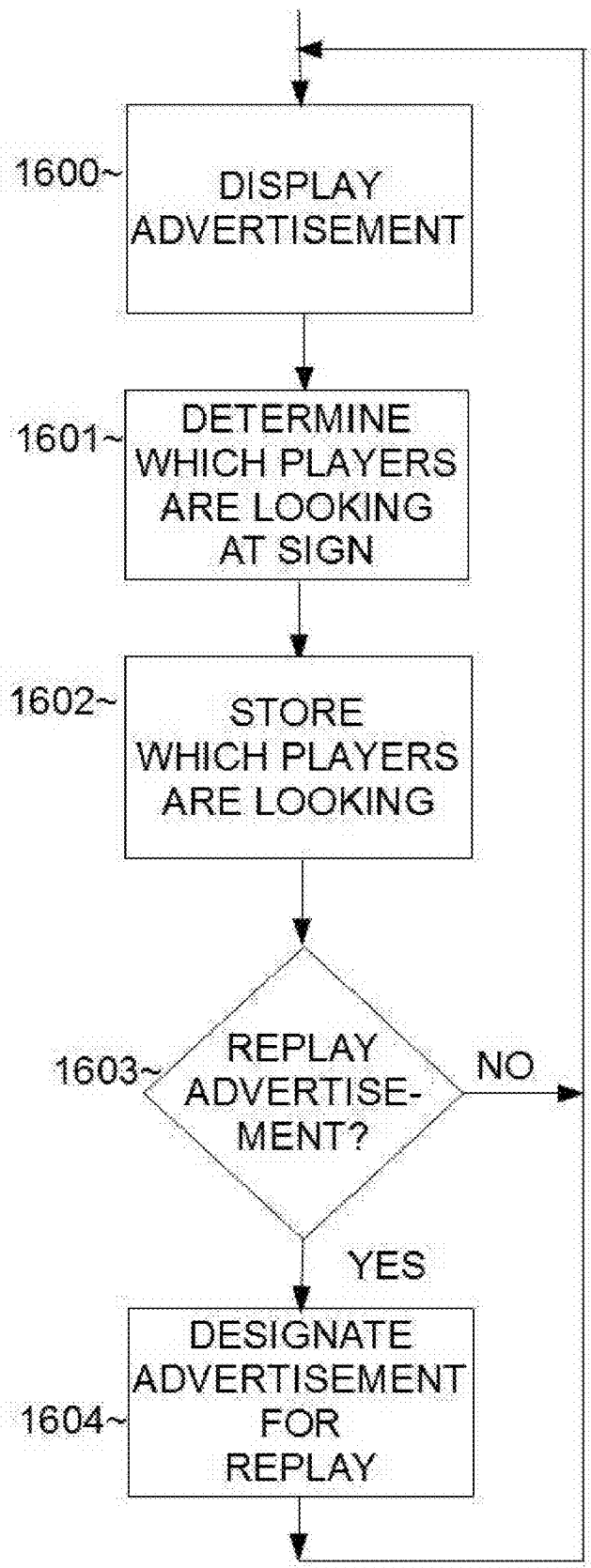
FIG. 16 is a flowchart illustrating a method of re-displaying advertisements utilizing gaze detection, according to an embodiment.

FIG. 16 is a flowchart illustrating a method of re-displaying advertisements utilizing gaze detection, according to an embodiment.

The method can begin with operation 1600, which displays an advertisement. This can be done as described herein.

Note that operations 1601 to 1602 can be performed while operation 1600 is being performed, that is while the advertisement in operation 1600 is being played.

In operation 1601, it can be determined (using a computer integral to the sign or a computer external to the sign in communication with the sign, as with any feature described herein), which players are looking at the sign while the advertisement is playing. In order for a player to be considered looking at the sign while the advertisement is playing, the player would have to be looking at the sign for at least a predetermined period of time (e.g., 3 seconds, 50% of the length of the advertisement, etc.)

From operation 1601, the method proceeds to operation 1602 which stores which players are looking at the advertisement (determined in operation 1601). This can be used when statistics are tabulated for each advertisement (e.g., see FIG. 14) so that only players who were determined to be looking at the sign when a particular advertisement is playing is included in the statistics for that sign. For example, a player at a table when an advertisement is playing that does not look at the sign at all while the advertisement is playing, or looks at the sign but for not enough time to be considered looking at the sign during the advertisement (e.g., looks at it for less than 3 seconds), is not included when the players at the table during an advertisement's display are accounted for and stored in the database in order to generate statistics for each advertisement. For example, if there are three players at a table, and advertisement #109 is displayed at 10:05 pm on Jan. 23, 2013, if only player "Bob" is looking at the sign while the advertisement is playing, then only "Bob" is recorded in the database as watching that particular display of the advertisement.

From operation 1602, the method proceeds to operation 1603, which determines whether to replay the advertisement that was just shown based on the players that were looking at the sign when the advertisement was displayed. A number of different methods can be used to determine whether to replay an advertisement. In a first method, if a particular player was an intended recipient of the advertisement (e.g., the particular player previously redeemed a coupon for the same advertiser and so another advertisement from this advertiser is deliberately shown again for this player) and the particular player did not see the advertisement (was not looking at the sign when the advertisement was showing for the prerequisite amount of time as described herein), then the advertisement should be replayed. In another embodiment, if a majority of players at the table did not see the advertisement then it would be replayed (while if the majority of players at the table did see the advertisement then it would not be replayed). In another embodiment, if all players at the table did not see the advertisement then it would be replayed (while if all players at the table did see the advertisement then it would not be replayed).

In if operation 1603, it is determined that the advertisement does not need to be replayed, then the advertisement in question does not need to be replayed and a new advertisement is chosen (as described herein), and the method returns to operation 1600 which displays the new advertisement.

If in operation 1603, it is determined that the advertisement does need to be replayed, then the method proceeds to operation 1604 which designates the advertisement for replaying. This can be mean a number of things. In one embodiment, the advertisement can be immediately replayed again as the method returns to operation 1600 which shows the same advertisement again. In another embodiment, the method returns to operation 1600 and the advertisement in question can be replayed after one or two (or any other number) of other advertisements are displayed first. This is so the same advertisement is now shown twice in a row. In a further embodiment, the advertisement in question would be considered not displayed when it was displayed (e.g., if it was shown at 13:05 at table #234 in casino AB then this showing would be considered to not have happened for the purposes of the advertiser being charged for this advertisement display). Thus, advertisers can pay for each time their advertisement(s) are shown.

In this manner, advertisements that are not viewed by players can be replayed in order to provide guaranteed coverage for the advertiser. In addition, in embodiments where the advertiser pays a fee (to an administrator of the entire system comprising the signs) for each time an advertisement is shown, if the advertisement does not have the requisite number of players watching it then it is not counted as a displayed advertisement (and the advertiser is not due the fee for this showing). Similarly, an advertiser can pay a fixed price to have his advertisement displayed 100 times, and if one or more showings are not seen by the required number of players at the table then these showing(s) do not count in the 100 advertisement displays purchased by the advertiser.

In a further embodiment, an advertiser can pay a price per person that has watched the advertisement. For example, each time an advertisement is shown, the number of people watching/seeing the advertisement can be determined and tabulated. The advertiser can then only pay for the number of people that have actually seen the advertisement. For example, if an advertiser and the administrator of the system agree that the advertiser would pay $0.01 for each person that sees the advertisement, and the advertisement is shown twice, the first time at a table of 5 where nobody watches the advertisement on the sign for the prerequisite amount of time (using gaze detection as described herein) and the second time the advertisement is shown 3 people out of a table of 7 meet the requirements to be considered to "watch" the advertisement (e.g., look at the sign for 2 or more seconds, etc.), then this advertiser would be administrator of the system $0.03.

Figure 17:
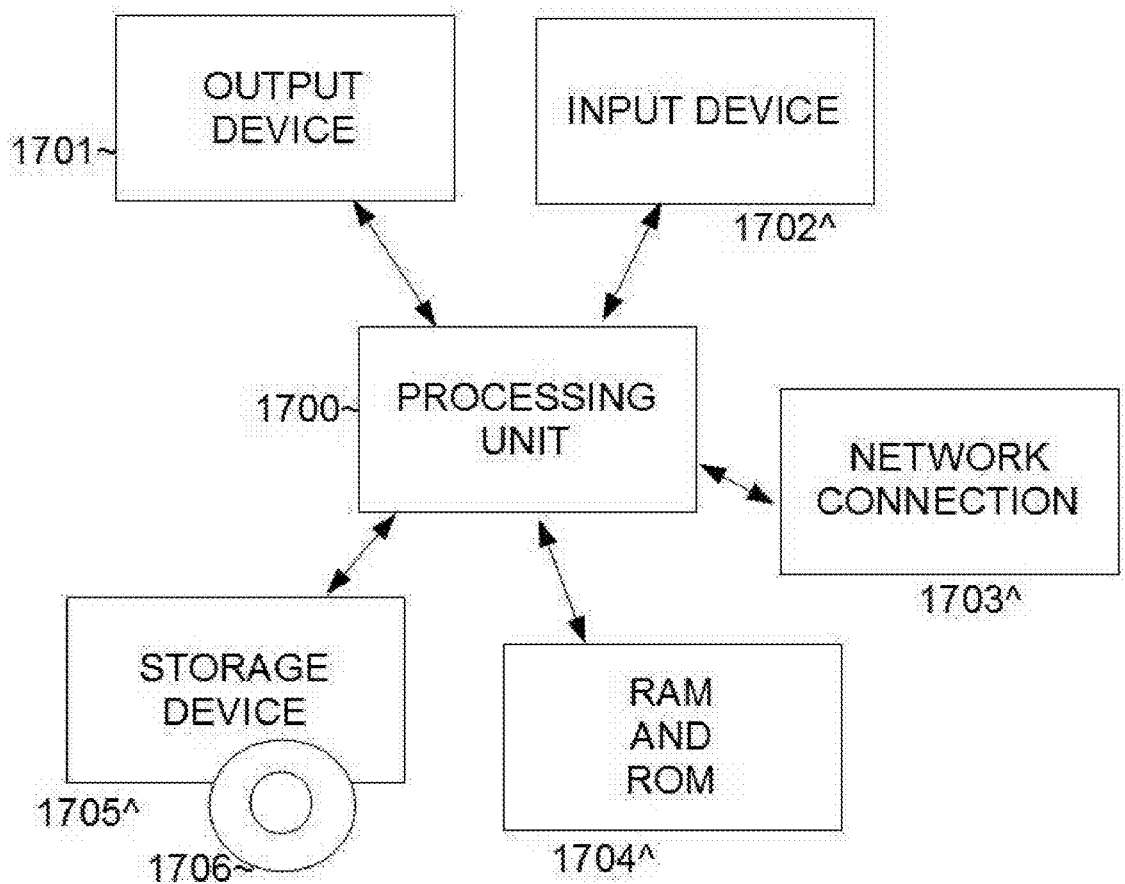
FIG. 17 is a block diagram of hardware that can be used to implement a computer, according to an embodiment.

FIG. 17 is a block diagram of hardware that can be used to implement a computer, according to an embodiment. This hardware can be used to implement any computer, server, database, sign, etc., described herein.

A processing unit 1700 can be a microprocessor and any associated structure e.g. cache, bus, graphics processor etc. The processing unit 1700 can execute computer readable instructions (stored and retrieved from a ROM, RAM, non-transitory computer readable storage medium, or any other storage device) which can implement any and all of the methods/features described herein. The processing unit 1700 can be connected to an output device(s) 1701 which can be for example and LCD, CRT, plasma display etc. the processing unit 1700 can also be connected to an input device(s) 1702 which can comprise a keyboard, mouse, buttons, etc. The processing unit 1700 can also be connected to a network connection 1703 which can connect the computer across any type of computer communications network e.g. Wi-Fi, widearea network, local area network, Internet, etc. the processing unit 1700 can also be connected to a RAM and a ROM 1804. The processing unit 1700 can also be connected to a storage device 1805 which can be any type of storage device such as a hard disk drive, CD-ROM drive, EPROM, Blu-ray drive, etc. A non-transitory computer readable storage medium 1706 can be read/written by the storage device 1705. The computer readable storage medium 1706 can contain instructions to perform any and all of the methods/features described herein on the processing unit 1700.

While FIG. 17 shows one such device, it can be appreciated that a combination and/or network of such devices can be combined either in the same physical location or in different physical locations and connected by a computer communications network, in order to effectuate any of the methods/features described herein In another embodiment, near field communication (NFC) can be used to transmit a coupon from the sign to the player's device. This is in contrast to other methods described herein which use Wi-Fi, Bluetooth, etc. This can be accomplished by the player viewing an advertisement/coupon on the sign that they want and then they can hand their player's device (e.g., cell phone, etc.) to a pit person (employee working in the pit where the casino table is). The pit person would then choose the particular advertisement/coupon that was displayed using a display on the rear of the screen to send to the player's device.

Figure 18:
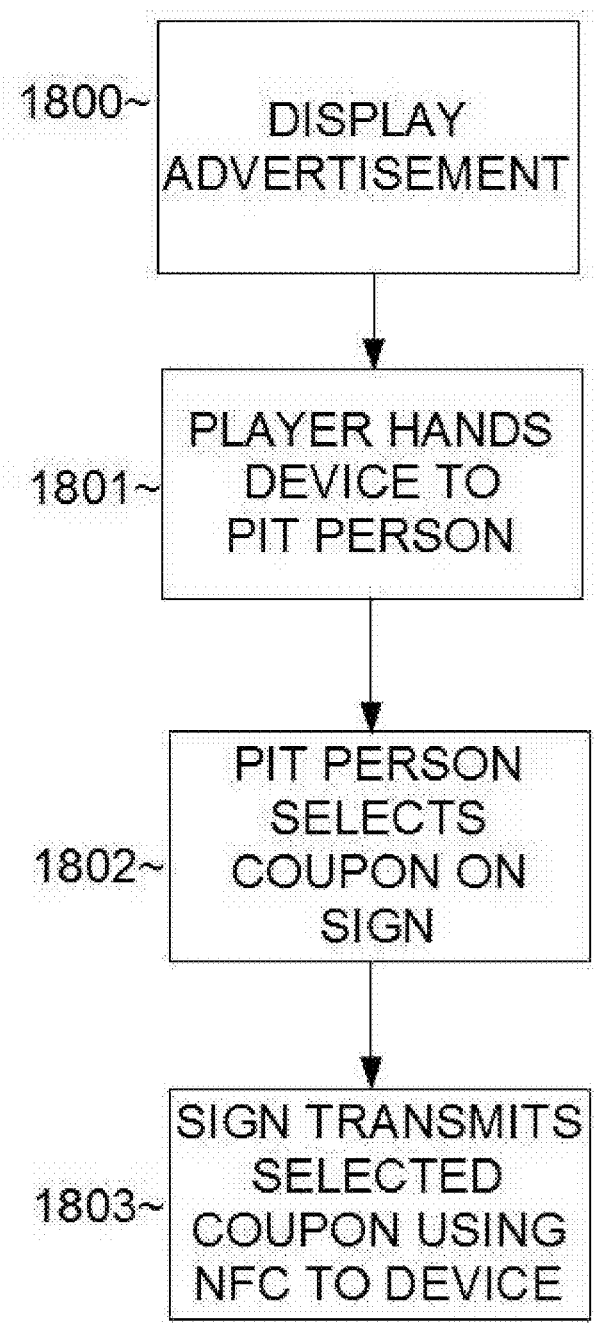
FIG. 18 is a flowchart illustrating an exemplary method of transmitting a coupon using near field communication.

FIG. 18 is a flowchart illustrating an exemplary method of transmitting a coupon using near field communication.

The method begins with operation 1800, wherein a coupon (advertisement) is displayed on a sign at a casino table.

From operation 1800, the method proceeds to operation 1801, wherein a player at the casino table wants the coupon that was displayed and so he hands his player device (e.g., cell phone, etc.) to the pit person and tells the pit person the particular coupon that he wants.

From operation 1801, the method proceeds to operation 1802, wherein the pit person selects the particular coupon on the back of the sign. The sign can comprise a front display (which is used to display advertisements) and a rear display (another LCD or similar output technology) which is used by the casino personnel in the pit to configure the sign and set its option. The read display (can be a touch-screen display) can also be used by the casino staff to select a particular coupon (by touching) out of a plurality of coupons that the sign has displayed (or can display). One example of the rear display window used for this purpose is illustrated in FIG. 19.

From operation 1802, the method proceeds to operation 1803. Once the pit person selects the particular coupon in operation 1802, then in operation 1803 the pit person can hold the player's device close to the sign and the coupon can then be transmitted from the sign to the player's device using NFC. In this way, the player has the coupon which can then be utilized and processed using any embodiment described herein. It typically should not make a difference how the coupon was actually transmitted to the player (e.g., Bluetooth, Wi-Fi, via internet, NFC, etc.)

FIG. 19 is a drawing of an exemplary rear screen of a sign used to select a coupon, according to an embodiment.

A coupon select window 1900 is displayed on the rear side of the sign which is displayed to the pit person (the players at the table typically will not see this screen since it is facing the pit). The pit person would touch the line that the player told the pit person he/she wishes to have. All of these coupons are coupons that this sign has recently displayed (or alternatively all the coupons this sign has ever displayed, or alternatively all the coupons that sign is currently capable of displaying).

A NFC prompt window 1901 is displayed which prompts the pit person to hold the player's device up to the sign so that the coupon can be transmitted via NFC from the sign to the player's device. The sign would transmit the coupon using NFC to the player's device and the player's device can acknowledge receipt of the coupon via NFC back to the sign. The player's device now has the coupon, and the sign has received from the player's device the player's identity (e.g., name, player number in the player database, and any other information described herein) which is reflected in the advertisement database (so the advertiser knows that this particular player has received this coupon).

In an embodiment, aspects used to determine targeted advertisements displayed a on a sign can be determined both by optical recognition (using one or more cameras) and information provided (contributed) by the player (e.g., the player presenting his player's card (or comp card or loyalty card) so that the player's identity is known to the system and information about the player can be retrieved in the casino or player database). Both systems (optical and player database) can be combined so that as much information about players at the table can be determined. In another embodiment, only information from the player database is used (not optical information is retrieved and the cameras may or may not even be present). In another embodiment, only optical information is used (but not information using a player's comp card or other identification method to retrieve information from the player database).

In a further embodiment, an electronic system can be used to identify potential underage players so the casino can take appropriate action. The cameras can capture images of players who are at gaming tables and images of those players (comprising their body and/or face) are transmitted to a face analysis software program in order to compute a predicted age of the player. Players who are computed as being under 21 are flagged for potentially being underage (and in fact players computed as being under 30 (or any other age) can also be flagged in order to ensure that most/all underage players are flagged). The casino personnel can then be notified and then can card (ask the player for identification) in order to verify the player's age. Of course, if the player is under 21 the player would not be allowed to play and should be expelled (removed) from the casino, with possible legal action (e.g., contacting the authorities so the underage player can be arrested).

Figure 20:
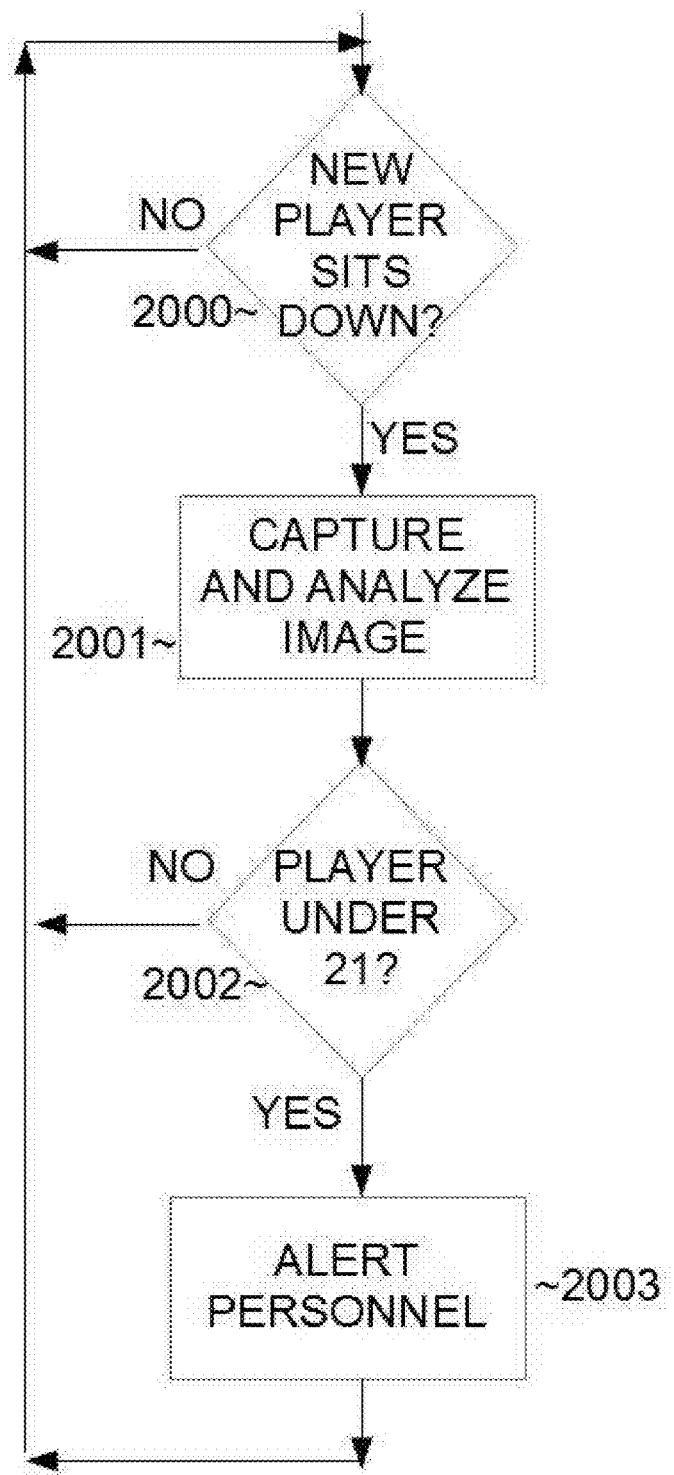
FIG. 20 is a flowchart illustrating an exemplary method of identifying underage players, according to an embodiment.

FIG. 20 is a flowchart illustrating an exemplary method of identifying underage players, according to an embodiment.

The method can begin with operation 2000, when the system determines that a new player has sat down (joined a gaming table such as blackjack, craps, slots, or any casino game). If no new player has sat down, the method returns to operation 2000 which continues to detect new players. As an alternative to detecting new players, the method can continuously process all players current playing in sequence, which mean some players will be processed more than once.

If in operation 2000, a new player has been detected, then the method proceeds to operation 2001, which captures an image of the new player and analyzes the image of the new player. This is done by running software to analyze the image of the new player (the image can be of the new player's face only or the face plus body) and determines an estimate of the player's age. Off the shelf software packages exist which analyze images of people to compute an estimate age.

From operation 2001, the method proceeds to operation 2002, which determines if the estimated age is under 21. Note that in most jurisdictions in the U.S., the legal gambling age is 21 and thus gamblers who are under 21 (or whatever the legal minimum age is) are considered "underage "and should be removed. Note that instead of 21, in order to ensure most underage players are identified (even ones that may look older than 20), a larger age threshold can be used (e.g., 30 or any other number). Note that in an embodiment, a confidence level can be returned. For example, the age analysis software could return a result that the player is under 30 with a confidence level of 0.75 (meaning 75% of the time it would be correct). If the software uses a confidence level, then a confidence threshold can be set to a high number (e.g., 90% to 100% or other number). For example, if the confidence threshold is set to 95%, then operation 2002 would only result in "YES" when the software returns that the image is a player under 21% with a confidence level higher than 95%. If in operation 2002, the result is a "NO" (the software concludes that the player is not under 21, or in the embodiment which uses a confidence interval the software concludes either the player is not under 21 or that the player is under 21 with a confidence interval smaller than the confidence threshold), then this player is not flagged as being underage and the method returns to operation 2000.

If in operation 2002, the player's age is determined to be under 21 (or it is determined to be under 21 with a confidence interval greater than equal to the confidence threshold), then the method proceeds to operation 2003, which alerts casino personnel. Casino personnel can be notified and security can be sent to card the player (make them show an official identification) so they can prove they are really at least 21 years of age. If the player is really 21 (or greater) then of course they can remain playing. If not, they would be ejected from the casino (and possible further action such as calling the police). Casino personnel can be notified in numerous ways, for example a message/email (or other electronic message can be sent) to a terminal (or portable device such as a cell phone, etc.) owned or monitored by a casino employee. The message/email would provide information about the underage player such as his/her name, location, image, etc. Alternatively, an automatic call can be placed to a telephone of the casino employee notifying them (using a computerized message) of the underage player and the player's location.

Thus, the method illustrated in FIG. 20 provides for an automatic system in which underage players can be automatically detected by the software and casino personnel (e.g., security) can be alerted to investigate further. This can help alleviate the problem of having underage gamblers present in a casino.

In a further embodiment, instead of identifying underage players, players who are excluded can automatically be identified. Excluded players can comprise players who are "self-excluded", which are players who excluded themselves by registering with the casino and notified them they should no longer be permitted to enter the casino ever again (e.g., because they are fighting a gambling problem, etc.) Excluded players can also comprise barred players who have been excluded by the casino itself, because cheating, criminal activity, advantage play, or any reason that a casino wishes to exclude a player from ever being allowed on the casino premises again. A database is maintained of all of the excluded players (self-excluded and barred) which contains all information about these players, e.g., names, aliases, fingerprints/image characteristics (which allows images taken of other players at the casino to be compared to all the players in the database of excluded players to determine if there is a match (e.g., it is the same person)), etc.

Figure 21:
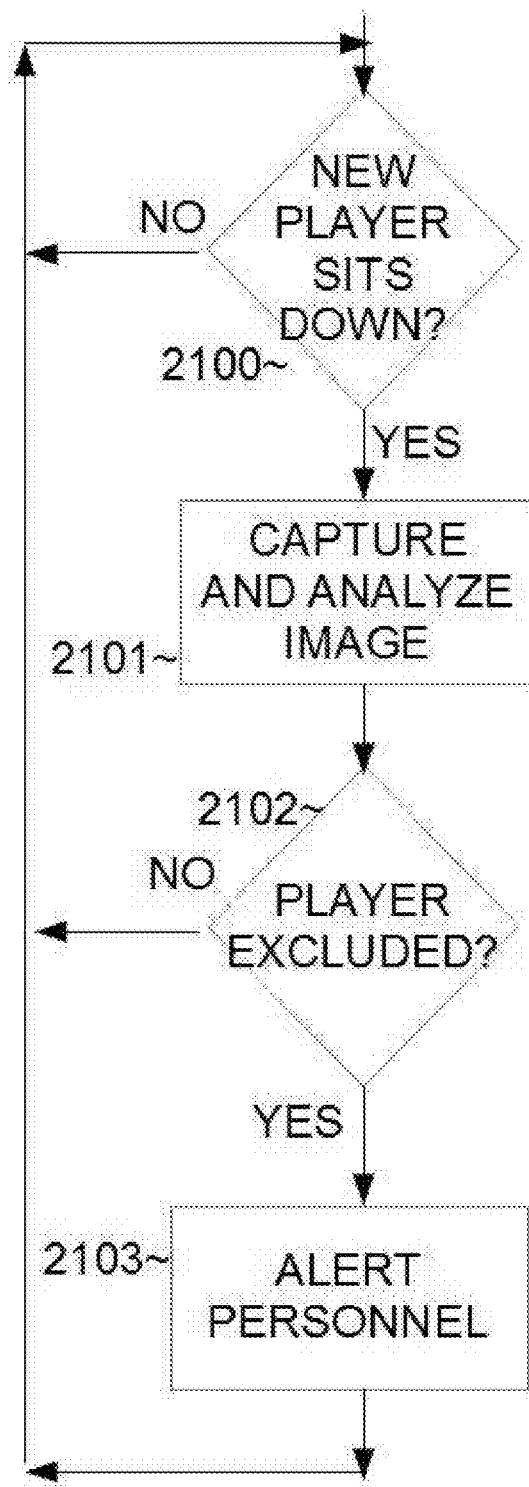
FIG. 21 is a flowchart illustrating an exemplary method of identifying excluded players, according to an embodiment.

FIG. 21 is a flowchart illustrating an exemplary method of identifying excluded players, according to an embodiment. Implementing FIG. 21 is similar to implementing FIG. 20, with the difference that the image is compared to an existing database of excluded players.

FIG. 21 can begin with operation 2100 (this can be done as in operation 2000), which determines when a new player sits down at a table. This can also include when a new player enters the casino. If no new player exists, then the method continues to operation 2100 to continue scanning. If a new player exists, then the method proceeds to operation 2100. In another embodiment, a scan of all players in the casino can be continuously performed and processed, such that every player in the casino would continuously have their image captured and processed to determine whether the player is an excluded player.

In operation 2100, an image of a new player (or existing player that is processed) is captured and analyzed. This can be done as in operation 2001. An image of a player is captured and passed to analysis software. In this case, the software analyzes the image to determine the player's "fingerprint" or numerical characteristics that define the player (e.g., player's face and optionally including the player's body as well).

The method then proceeds to operation 2102, which determines whether the player is excluded. This is accomplished by comparing the fingerprint of the player from operation 2101 with fingerprints (e.g., visual characteristics of the player's face) from all excluded players in the database. If no match is found, then the player is not excluded and the method returns to operation 2100. If a match is found, then the method proceeds to operation 2103. In an embodiment, a confidence level can be returned such that the player is a match with a person in the excluded database with an accuracy of X % (e.g., X % of the time the match would be correct). The casino can set a confidence threshold such the confidence level would have to be at least the confidence threshold in order for a match to be concluded. For example, if the confidence threshold (set by the casino) is 98%, then if the software returns that there is a match between the player and a person in the excluded database with a confidence level of 97% then this would not be considered a match (because it is lower than the confidence threshold) but if the confidence level was 98% then it would be considered a match (because the confidence level would be at least the confidence threshold). A match between the player and a person in the excluded database means that the player is determined to be excluded and the method proceeds to operation 2103. If there is no match between the player and any person in the excluded database then it is concluded that the player is not excluded and the method returns to operation 2100 to process other players.

In operation 2103, casino personnel are alerted (e.g., security) that the player has been determined to be an excluded player and casino security can address the situation as they feel appropriate (e.g., approach the person, check his identification, etc.)

It is noted that in operation 2003 (identifying an underage gambler) and operation 2103 (identifying an excluded gambler), if the player identified (as being underage or excluded) is sitting at a casino table (e.g., blackjack), then the back (rear) of the digital sign (as described herein) can display a notification that there is a player at the table that is underage (or excluded). The notification can comprise the player's name, photograph, location at table, or any other information known about the player, so that the casino staff can take the appropriate action. Casino personnel can also be notified in numerous ways, for example a message/email (or other electronic message can be sent) to a terminal (or portable device such as a cell phone, etc.) owned or monitored by a casino employee. The message/email would provide information about the excluded player such as his/her name, location, image, etc. Alternatively, an automatic call can be placed to a telephone of the casino employee notifying them (using a computerized message) of the excluded player and the player's location.

FIGS. 20 and 21 can operate simultaneously, thus the system can be detecting for both underage gamblers as well as excluded persons at the same time.

In a further embodiment, players who were carded (the casino checking their identification to make sure they are not underage) can be tracked so that the same players do not get carded again (which may be inconvenient to both the casino staff and the player).

Figure 22:
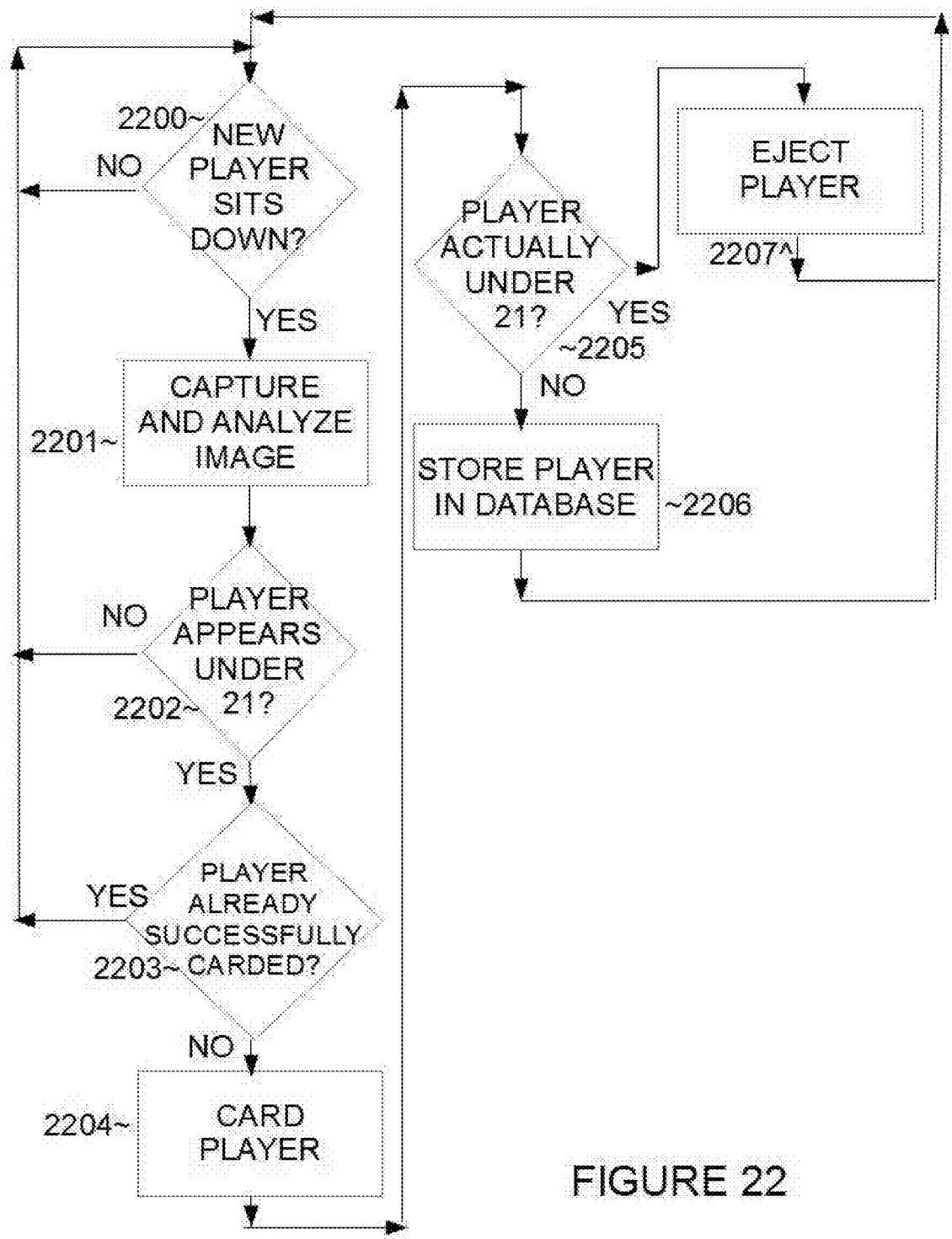
FIG. 22 is a flowchart illustrating an exemplary method of identifying and tracking carded players, according to an embodiment.

FIG. 22 is a flowchart illustrating an exemplary method of identifying and tracking carded players, according to an embodiment.

The method begins with operation 2200, which detects a new player sitting down (or entering the casino). This can be done as described with regard to operation 2000.

From operation 2200, the method proceeds to operation 2201, which captures and analyzes an image. This can be done as described with regard to operation 2001.

From operation 2201, the method proceeds to operation 2202, which determines whether the player appears under 21 (or whatever the legal age minimum is). This can be done as described with regard to operation 2002.

If in operation 2202, the player appears under 21, then the method proceeds to operation 2203, which determines whether the player was already successfully carded. Successfully card means that operation 2205 was performed and the result was that the player was verified to be no under 21 (operation 2206). The determination of whether the player was already successfully carded is made by comparing the player's image (or more specifically the fingerprints or characteristics of the player's image) to the respective values for the other players in the roster of successfully carded players in the database. If there is a match, then the player was already successfully carded and there is no need for the player to be carded again and thus the method returns to operation 2200 (no action is taken with regard to the player since the player was already carded). Note that a match can incorporate a confidence level. For example, there can be determined to be a match between the player and an already successfully carded player with a confidence level of 95% (thus the software determines that there is a 95% chance that the player is actually the already successfully carded player). If this confidence level is greater than (or greater than equal to) a confidence threshold (set by the casino) then this is considered a match. For example, the casino can set their confidence threshold to be 98% (which means only matches (actually potential matches) with a confidence level of 98% or more will be considered a match). In the case above where there is a match (potential match) with a 95% confidence level, this is not high enough to meet the confidence threshold and thus this would not be considered a match (thus it would be considered that the player was not already successfully carded). If the player (whose image was captured in operation 2201) was not already successfully carded, then the method proceeds to operation 2204.

In operation 2204, the player is carded by the casino personnel which entails the casino employee/personnel (e.g., a security officer) asking the casino personnel for their identification (e.g., license or other official identification which shows their birth date) and the player showing the identification to the casino employee.

From operation 2204, the method proceeds to operation 2205, which determines whether the player is actually under 21 (or the legal age). Note anywhere 21 is used herein with regard to age it can represent whatever legal age requirement (whether by federal, state or local laws, or can be an age requirement of the casino or other establishment itself). Thus, any age can be used in place of 21. If the player is determined to actually be under 21, then the method proceeds to operation 2207, wherein the player is ejected from the casino (with a possible notification to law enforcement).

If in operation 2205, the player is not actually under 21 (e.g., the player is of legal age), then the method proceeds to operation 2206 wherein the player is stored (added) to the roster of successfully carded players in the database. The player's characteristics, such as the player's name, age, etc., and also image characteristics (e.g., the image captured in operation 2201 as well as some or all other relevant image characteristics needed to determine whether this player is a (match) the same person in a different image (e.g., fingerprints, visual characteristics, etc.). This player may end up getting up from his/her current casino table and sit down at another table and his/her image may processed again for being a potential underage player. The new image of this player would be different from the image stored for the same player in operation 2206 (e.g., different background, lighting, distance, angle, etc.) and so the visual characteristics stored would have to enable the computer to determine that a different image of the same player (in operation 2203) is a match for this player (and thus there is no need to card this player again).

In an embodiment, the image characteristics stored in the database 2206 may also include information about the player's clothing (e.g., colors, patterns, size, etc.) which would increase the confidence level of a match. If the same player were to go to his/her room and change clothes, this may cause the system not to recognize the same player in the database (roster of successfully carded players) since the confidence level of the match would be reduced because the outfit did not match.

Note that the roster of successfully carded players can expire periodically. For example, 24 hours (or any other period) after a player has been successfully carded, this player's entry in the roster would expire (be deleted) so that if the player were to return the player would have to be carded again (upon detection as an underage player).

From operations 2206 or 2207, the method returns to operation 2200 which continues to scan for players.

Note that the casino can set different confidence thresholds for age detection (e.g., operations 2002 and 2202), matches for excluded player detection (operation 2102), and matches for player already successfully carded (operation 2203). The casino can set all of these values as different thresholds to whatever suits their preferences. Note that in an embodiment, the actual detected confidence levels needs to be greater than the respective confidence threshold in order for the condition (e.g., match, underage person, etc.) to be satisfied (otherwise the condition is not satisfied). In another embodiment, the confidence level needs to be greater than or equal to (≥) the respective confidence threshold in order for the condition (e.g., match, underage person, etc.) to be satisfied (otherwise the condition is not satisfied).

In a further embodiment, the rear of the table sign (where the identified underage or excluded player is sitting) can be used to prompt a casino employee (such as the pit staff working in the pit where the table is at) to visually identify the player in question. The previous embodiments were entirely automatic, that is, the system would automatically identify underage or excluded players and notify the casino personnel to take further action. In a further embodiment, a prompting mechanism can be used to prompt the casino employee to visually confirm whether the player in question looks underage or is the excluded player. The table sign at the table has a rear touch-screen LCD (in addition to the front LCD) that the players typically do not see and can be used to display messages intended for the pit staff (casino employees).

Figure 23:
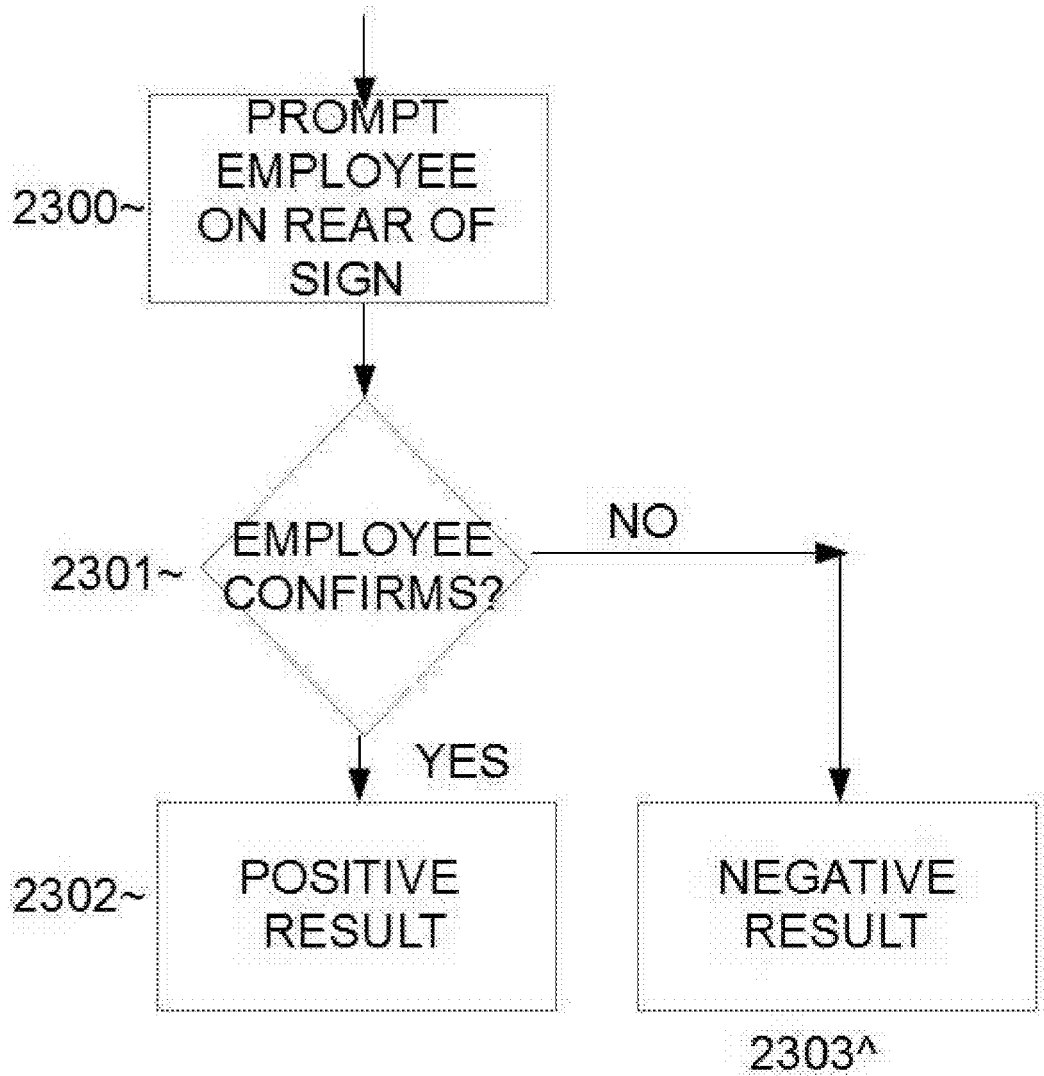
FIG. 23 is a flowchart illustrating an exemplary method of prompting for verification, according to an embodiment.

FIG. 23 is a flowchart illustrating an exemplary method of prompting for verification, according to an embodiment.

In operation 2300, the casino employee is prompted on the rear of the sign to press a virtual button on the touch screen depending on what the casino employee sees. If a player is detected to be under 21, the sign can prompt the casino employee to look at the player to determine whether he/she really appears under 21 or not and whether carding is really necessary. If a player is detected to be an excluded player, a picture of the actual excluded player can be displayed on the sign so that the casino employee can respond by pressing a button whether the player at the table is really the excluded player or not.

From operation 2300, the method proceeds to operation 2301, which determines whether the employee confirms that the player's presence may be a problem (e.g., underage looking player or excluded player). If the casino employee does not confirm (e.g., by pressing a "no" button on the rear of the sign), then the method proceeds to operation 2303 which is a "negative result", that is, it is considered a "false alarm" and no further action is taken regarding the player. This would be the same result as if the player was never flagged/identified by the system as being possible underage or an excluded gambler.

If in operation 2301, the employee confirms that the player meets the alleged description (e.g., is the excluded player), then this is treated as a positive match and the method proceeds to operation 2103. Regarding underage players, there can be two embodiments. In a first embodiment, when the casino employee confirms that the player looks underage, then the system proceeds to operation 2003 which alerts the casino personnel to card the player. In a second embodiment, upon seeing a prompt for an underage gambler (e.g., "is the player at seat 1 under 21?"), the casino employee seeing the prompt would card the alleged underage player and then a positive result (e.g., pressing "yes" on the screen) would be that the player is indeed underage (under the tested for minimum such as 21) and a negative result (e.g., pressing "no" on the screen) would be that the player is not underage.

Note that the method illustrated in FIG. 23 can be entirely optional, e.g., in one embodiment no prompting is used and the entire system is automatic. In another embodiment, the prompting can be used when triggered in certain situations.

For example, when prompting for underage players, in one embodiment, operation 2300 is performed instead of operation 2002. In another embodiment, operation 2300 is performed before operation 2002 (if the result is positive then operation 2002 is performed, and if a negative result then the method returns to operation 2000).

With regard to detecting excluded players, operation 2300 can follow operation 2102. For example, if the employee at the prompt indicates a positive result then the method proceeds to operation 2103 which then alerts personnel, while a negative result results in no action (returning to operation 2100). In another embodiment, operation 2300 can be triggered based on the confidence level of a match between the player at the table and a counterpart excluded player in the database of excluded players. For example, Table III below illustrates one example of different confidence levels and respective actions.

TABLE III

| Confidence level | Action |
|---|---|
| <85% | take no action |
| 85-95% | prompt |
| >95% | alert personnel |

Thus, if the confidence level is below 85% then no action is taken with respect to the player (e.g., the player is assumed to not be on the excluded list). If the confidence level is in the range of 85% to 95% then the prompting occurs (FIG. 23) and the employee is prompted to visually confirm or deny that the player is actually the counterpart excluded player in the excluded player database (a picture will be displayed of the actual counterpart excluded player so that the casino employee can judge). If the casino employee enters a negative result (not the same person), then no further action is taken. If the casino employee enters a positive result (is the same person), then the method proceeds to operation 2103 which alerts casino personnel that an excluded player is playing. If the confidence level is greater than 95%, then the prompting does not take place and the method automatically proceeds to operation 2103 which alerts casino personnel.

The same "tiered" approach can optionally be used when detecting for underage gamblers as well. If the confidence level is above a certain amount, then casino security is automatically alerted. If the confidence level is below a certain amount, then no action is taken. If the confidence level falls in the middle of the two values (e.g., see Table III), then a casino employee is prompted using the sign.

In a further embodiment, prompting will always take place when the confidence level is greater (or greater than equal to) the confidence threshold. In other words, when a potential excluded gambler is detected with a sufficient confidence level (e.g., a "yes" in operation 2102) then operation 2300 would always follow (and a positive result would be in security being called to remove the player or at least check his ID before removing him). If a potential underage gamble is detected with a sufficient confidence level (e.g., a "yes" in operation 2002), then operation 2300 would always follow.

Figure 24:
FIG. 24 is drawing of examples of prompt screens, according to an embodiment.
Figure 24:

FIG. 24 is drawing of examples of prompt screens, according to an embodiment.

Excluded player prompt 2400 shows a prompt when an alleged excluded player is detected (operation 23) and if the casino employee presses "yes" (positive result) then the method proceeds to operation 2302 and 2103. If the casino employee presses no (negative result) then the method proceeds to operation 2303 and 2100 (no action).

Underage player prompt 2401 prompts the casino employee to look at the player in a particular seat to see if the player is really potentially underage (in which security will be sent to card) or not (no action will be taken). Thus a positive result is pressing "yes" which proceeds to operation 2302 and 2003 and a negative result is pressing "no" which proceeds to operation 2303 and 2000 (no action taken).

Note that the method illustrated in FIG. 22 can also be used in conjunction with the prompting methodology described herein. The prompting methodology can be combined in any manner with the methods described herein for detecting underage and excluded gamblers, and FIG. 23 can be combined in any sensible manner with FIGS. 21, 22, and 24.

In a further embodiment, in addition to a "yes" and "no" button which is prompted to a casino employee to visually confirm a player is an excluded player, there can also be a "maybe" button which triggers different functionality.

Figure 25:
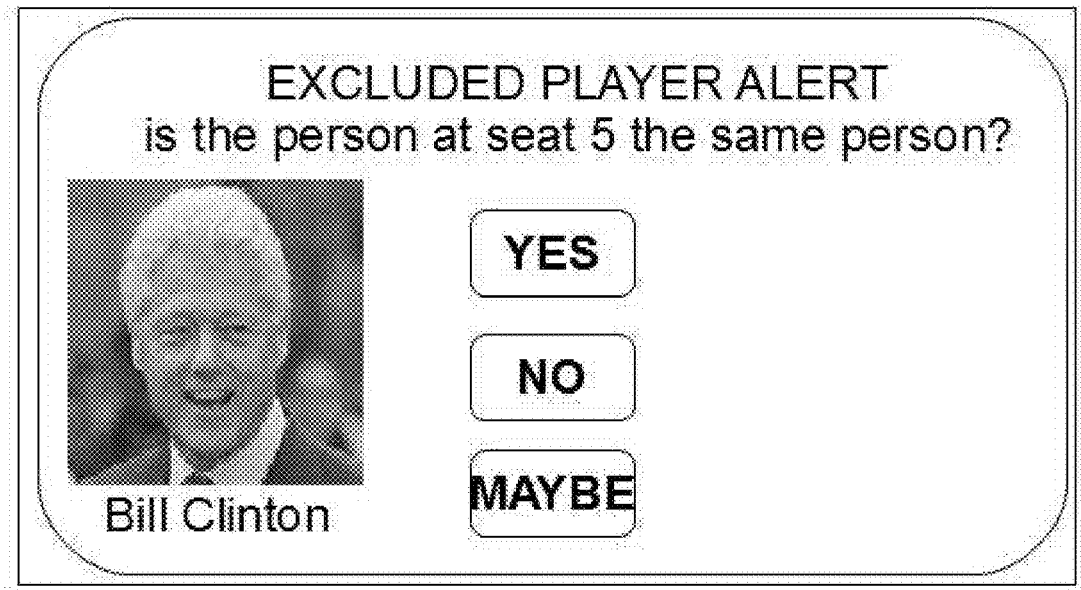
FIG. 25 is a drawing of prompt screen with a maybe button, according to an embodiment.

FIG. 25 is a drawing of prompt screen with a maybe button, according to an embodiment.

The yes/no/maybe prompt screen is similar to the excluded player prompt 2400 but also has a 'maybe' button. When the 'maybe' button is pressed, a notification can be sent to a different casino personnel then if the 'yes' button is pressed. For example, the 'yes' button can send a notification to security to send someone to eject the player. The 'maybe' button can send a notification to surveillance and/or a shift manager to card the player (or other verification technique) to determine whether the player is really the actual excluded player or not (if so, then the method then proceeds as if the 'yes' button was pressed and if not then the method then proceeds as if the 'no' button was pressed). The casino personnel who indicated that the player was not the actual excluded player may be required to swipe their employee ID (or input their employee number, etc.) so that it can be recorded that they were the one who made the decision (so they will be held accountable if they were incorrect).

When a player that was suspected as being an excluded player (e.g., because the player has similar visual characteristics to an excluded player in the database of excluded players) is determined not to be the actual excluded player (by carding the player, visually inspecting him/her, etc.) then that player and their image are stored in a list (or database) of successfully carded (or verified) players. This way, the same player will not be subject to being flagged for looking like an excluded player (because the system will recognize this player was already verified within a predetermined period of time). Typically, in the same day, the player will be dressed the same and thus the clothes can also be associated with the player's image which would help the confidence level when analyzing this same player again. The list (or database) of successfully carded players can be erased periodically (e.g., every 24 hours, every week, etc.) so that if the same player were to play again after it is erased they might be flagged again as being the excluded player they resemble. All decisions herein regarding whether a player matches an entry in a database can be done in terms of confidence levels, for example it will be rare that there will be a 100% match between an image in the database and an image captured from a live video camera. Thus, images are compared and a "match" is determined when a confidence level between them are greater than a preset/predetermined confidence level (also referred to as confidence threshold), for example a current confidence level between two images is 95% and this is higher than a preset/predetermined confidence level of 94% so it is considered to be a match.

In another embodiment, the 'yes' button will alert a casino manager and/or surveillance to do an actual ID check while the 'maybe' button will alert a casino supervisor who will monitor the player in question and not be the one who determines if it is really a match (e.g., the actual player is really the excluded player).

Figure 26:
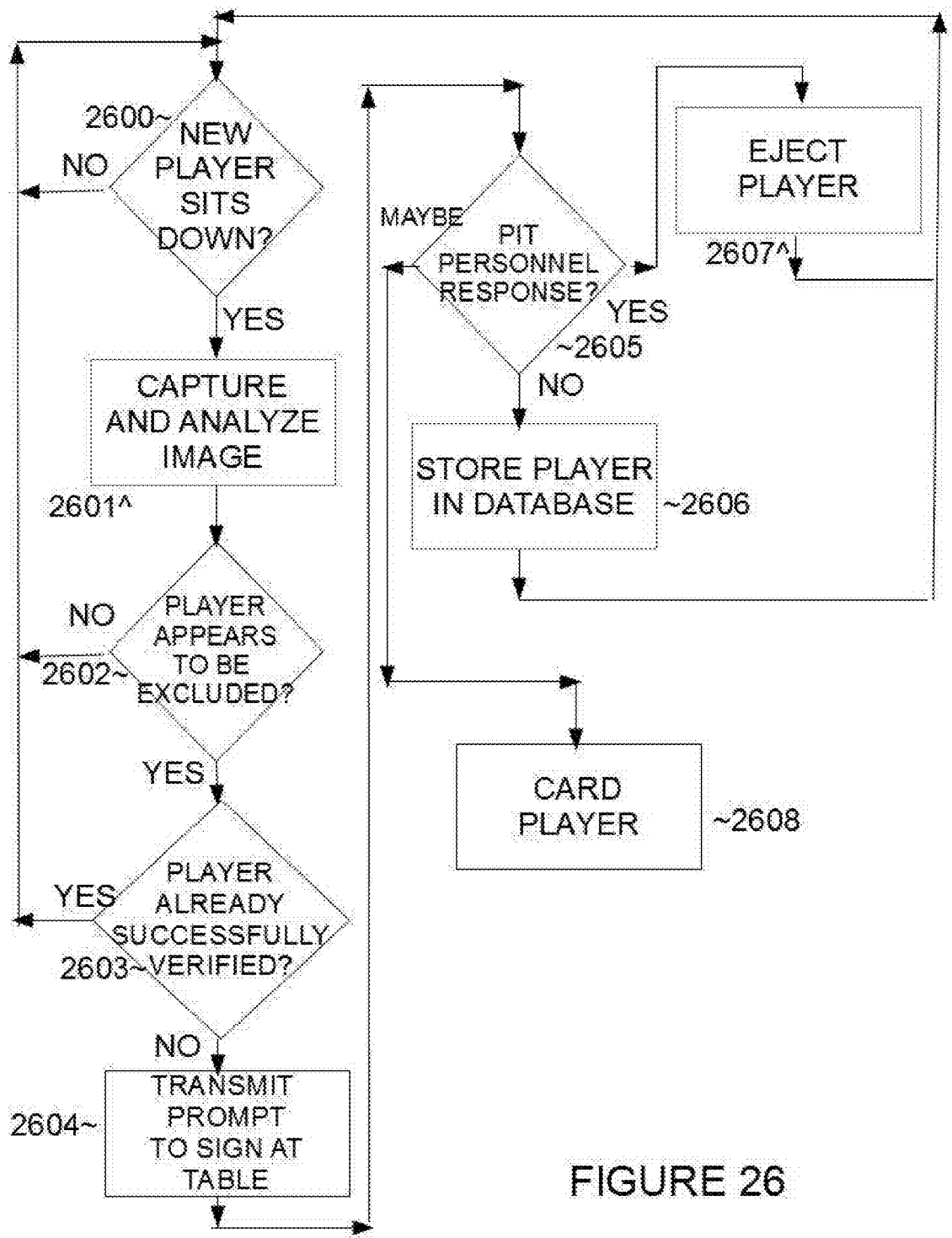
FIG. 26 is a flowchart illustrating an exemplary method of identifying and tracking excluded players, according to an embodiment.

FIG. 26 is a flowchart illustrating an exemplary method of identifying and tracking excluded players, according to an embodiment. The method is similar to FIG. 22 but operates on excluded players.

The method can begin with operation 2600, which visually detects (using any video camera connected to the system) when a new player sits down at a table (or enters a casino, etc.)

If a new player is detected ("detected player"), the method proceeds from operation 2600 to 2601, which captures and analyzes an image of the newly detected player form operation 2600. The captured image (or images) of the detected player are compared to images in the excluded player database to determine if there is a match (with a greater confidence level than a preset (predetermined) confidence level/threshold).

From operation 2600, the method proceeds to operation 2602, in which if the detected player does not appear to be an excluded player then the method returns to operation 2600 which continues scanning for new players. If the detected player does appear to be an excluded player in operation 2602 (e.g., there is a match), then the method proceeds to operation 2603.

In operation 2603, it is determined whether the detected player has already been successfully verified (in other words if the detected player (detected in operation 2600) is not in the current database/list of successfully verified/carded players), then the method returns to operation 2600 (the detected player is not the excluded player so there is no need to bother the detected player).

In in operation 2603, the detected player has not already been successfully verified, then the method proceeds to operation 2604, which transmits a prompt to the respective sign at the table the detected player is sitting at. Any computer/server/database that is implementing any of the methods described herein can address any sign at any table individually to communicate with (input and/or output). The prompt can take the form in FIG. 24 (2400) or FIG. 25, or other form. If the detected player is not sitting a table then the prompt can be transmitted to a casino personnel at a security station or other location (or on a casino personnel's portable device such as their cell phone).

From operation 2604, the method proceeds to operation 2605, which determines the casino employee's (personnel) response. If the employee pushes the 'no' button, the method proceeds to operation 2606. In this case, the detected player is not the excluded player and thus the detected player (his/her image and other identifying information) is stored in the database/of successfully carded (or successfully verified) players. The player's clothing can be stored as image information for the detected player in order to ensure a high confidence level if/when the detected player is re-detected (in operation 2600) so that there will be a positive match (in operation 2603) so this player is not bothered any more (for a period of time, e.g., 24 hours). If this player changes his clothes, then it may throw off the image comparison and the player may possibly not be properly matched with the player's entry in the list/database of successfully verified/ carded players (thus resulting in the method proceeding to operation 2604 all over again for the same player). After operation 2606, the method can return to operation 2600 to detect new players.

If in operation 2605, the employee's (personnel) response is 'yes' (e.g., the 'yes' button is pressed), then the method can proceed to operation 2607, in which the proper department at the casino (e.g., security) can be notified to eject the detected player.

If operation 2605, the employee's (personnel) response is 'maybe' (e.g., the 'maybe' button is pressed). Then the method can proceed to operation 2608, in which a notification is sent to a predefined department (or departments) such as casino supervisor and/or a casino manager who can further observe the player before deciding whether to indicate to the system a 'no' (that the player is not the excluded player which goes to operation 2606) or a 'yes' (that the player is the excluded player which goes to operation 2607). The casino can tailor their own rules to alert which casino personnel department upon which respective button is pressed (e.g., yes, no, maybe).

In this way, excluded players can be automatically detected and the appropriate casino personnel can be alerted depending on whether the detected player is determined to be the actual excluded player, is determined not to be the actual excluded player, or it is unclear whether the detected player is the actual excluded player or not. Once a player has been flagged as being an excluded player (but it has not been verified) and it is determined that the player is not the actual excluded player, then visual information about this player is stored so that the same player is not subject to another verification process. When a player is automatically identified as being an excluded player (e.g., operation 2602), this does not mean that the player is definitely the excluded player, only that the player's visual image(s) is close enough to an excluded player in the casino database to result in a confidence level higher than a predetermined confidence level. Matches lower than a predetermined (preset) confidence level would not be considered matches.

Note that the front of the sign is facing the players and displays the targeted messages and advertisements described herein. The rear of the sign displays the prompts which typically only the casino personnel can see since it would not be facing the players at the table. Any electronic server, computer, database, etc., can be used to process all of data/information described herein and run software to implement any and all of the methods/features described herein. A single or multiple computers (running a single or multiple processors) can be used in cooperation to effectuate all methods described herein. The image analysis software (age detection, person identification, etc.) can exist is a separate software package running on a same or different computer than other computer(s) used to carry out any and all of the methods described herein. As a simple example, the advertisement database 304 can communicate with all individual components/computers described herein (e.g., signs, cameras, databases, etc.) and can execute software (computer readable instructions) to perform any and all of the methods/ features described herein. It can be appreciated that a separate server (or any other database or computer described herein or not described herein) can exist which is enabled to communicate with all components/computers described herein and can execute software (computer readable instructions) to perform any and all of the methods/features described herein. All communications can be performed wirelessly, using wired connections, or any combination thereof and can use standard network communications protocols (e.g., each device can have its own IP address, etc.)

All components/computers described herein can be networked and thus individually routed communications can be easily implemented.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a (non-transitory) computer readable storage medium to control a computer. Programs and/or data required to implement any of the methods/features described herein can all be stored (and executed therefrom to perform any of the methods/features) on any non-transitory computer readable storage medium (volatile or non-volatile, such as CD-ROM, RAM, ROM, EPROM, microprocessor cache, etc.) All the methods and features described herein can be performed automatically via computer technology and networks without the need for human intervention or decisions.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system, comprising:
   a video camera located in a casino;
   a database comprising a roster of successfully carded players, wherein the roster of successfully card players comprises image characteristics of the successfully carded players; wherein select players in the roster of successfully carded players are automatically removed from the roster after a predetermined amount of time elapses, and wherein the amount of time elapsed is measured from when the select players were successfully carded;
   a computer in communication with the database, wherein the computer is configured to perform the following operations:
      receive images from the video camera;
      identify a player in the images;
      compute an estimated age of the identified player by analyzing a face of the identified player;
      based on the estimated age computed by analyzing the face of the identified player, determine whether the estimated age of the identified player is under a predetermined age; and
      when it is determined that the estimated age of the identified player is under the predetermined age, determine whether the identified player is currently in the roster of successfully carded players based at least in part on the image characteristics of the successfully carded players, and only if so, then the identified player is considered not to be under the predetermined age;
      when it is computed that the estimated age of the identified player is under the predetermined age and the identified player is not currently in the roster of successfully carded players, notify a casino employee to card the identified player, and after the identified player is successfully carded the successfully carded player is added to the roster of successfully carded players.

2. The system as recited in claim 1, wherein the computer is further configured such that the notify operation comprises transmitting an electronic message to the casino employee identifying a location of the identified player.

3. The system as recited in claim 1, wherein the computer is further configured such that the compute operation results in the estimated age being under the predetermined age when a confidence level of the age estimation is greater than or greater than equal to a confidence threshold.

4. The apparatus as recited in claim 3, wherein the computer is further configured such that the confidence threshold is set by the casino.

5. The system as recited in claim 1, further comprising a sign positioned at a gaming table, wherein the computer is further configured such that the notify operation displays a message on a rear display of the sign at the gaming table the identified player is located at.

6. The system as recited in claim 1, wherein the computer is further configured such that the select players in the roster of successfully carded players automatically are removed after the select players have been detected to leave the casino.

7. The system as recited in claim 1, wherein the computer is further configured such that when a confidence level of the estimated age of the identified player being determined to be under the predetermined age is in a certain range, then a casino employee is prompted on a rear of a sign positioned at a table game to input whether the player looks underage or not.

8. The system as recited in claim 1, wherein the computer is further configured such that when a confidence level of the estimated age of the identified player being determined to be under the predetermined age is in a certain range, then a casino employee is prompted on a rear of a sign at the table to input whether the player is actually underage or not.

9. The system as recited in claim 1, wherein the computer is further configured such that the predetermined amount of time is 24 hours.

* * * * *